(12) United States Patent
Su et al.

(10) Patent No.: US 11,995,743 B2
(45) Date of Patent: May 28, 2024

(54) SKIN TONE PROTECTION USING A DUAL-CORE GEOMETRIC SKIN TONE MODEL BUILT IN DEVICE-INDEPENDENT SPACE

(71) Applicant: SAMSUNG ELECTRONICS CO., LTD., Suwon-si (KR)

(72) Inventors: Chang Su, Foothill Ranch, CA (US); Chenguang Liu, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 17/816,259

(22) Filed: Jul. 29, 2022

(65) Prior Publication Data

US 2023/0102663 A1  Mar. 30, 2023

Related U.S. Application Data

(60) Provisional application No. 63/246,426, filed on Sep. 21, 2021.

(51) Int. Cl.
*G06T 7/11* (2017.01)
*G06T 7/90* (2017.01)
*G06T 11/00* (2006.01)

(52) U.S. Cl.
CPC ............. *G06T 11/001* (2013.01); *G06T 7/11* (2017.01); *G06T 7/90* (2017.01); *G06T 2207/10024* (2013.01); *G06T 2207/30196* (2013.01)

(58) Field of Classification Search
None
See application file for complete search history.

(56) References Cited

U.S. PATENT DOCUMENTS 6,278,533 B1 * 8/2001 Takemoto ............ H04N 1/6058
358/521
8,675,960 B2   3/2014 Reid et al.
(Continued)

FOREIGN PATENT DOCUMENTS

WO   2017-131343 A1   8/2017

OTHER PUBLICATIONS

Yu, J. et al., "Skin Detection for Adult Image Identification", In 16th International Conference on Advanced Communication Technology, Feb. 16-19, 2014, pp. 645-648, IEEE, United States.
(Continued)

*Primary Examiner* — Joni Hsu
(74) *Attorney, Agent, or Firm* — Sherman IP LLP; Kenneth L. Sherman; Steven Laut

(57) ABSTRACT

One embodiment provides a method comprising determining one or more coordinates representing one or more skin tones in a device-independent color space. The one or more skin tones can include one or more colors of human skin captured in one or more pieces of content. The method further comprises building a dual-core geometric model based on a distribution of the one or more skin tones in the device-independent color space. The method further comprises providing the dual-core geometric model to an electronic device for use in determining a likelihood that an input color of an input content is a skin tone. The input content is adaptively enhanced, based on the likelihood, for presentation on a display connected to the electronic device.

20 Claims, 18 Drawing Sheets
(8 of 18 Drawing Sheet(s) Filed in Color)

(56) References Cited

U.S. PATENT DOCUMENTS

| | | | |
|---|---|---|---|
| 9,398,280 | B2 | 7/2016 | Nikkanen et al. |
| 9,600,864 | B2 | 3/2017 | Peng et al. |
| 9,639,740 | B2 | 5/2017 | Ganong et al. |
| 10,497,103 | B2 | 12/2019 | Kashibuchi |
| 11,062,480 | B2 | 7/2021 | Zhao |
| 11,263,790 | B2 | 3/2022 | Seo et al. |
| 11,605,155 | B2 | 3/2023 | Parlaker |
| 2008/0056566 | A1 | 3/2008 | Shehata et al. |
| 2008/0056605 | A1* | 3/2008 | Shehata ............... H04N 1/6027 382/274 |
| 2008/0298704 | A1* | 12/2008 | Nachlieli ............... G06T 5/008 382/254 |
| 2015/0049123 | A1 | 2/2015 | Choi et al. |
| 2017/0076142 | A1* | 3/2017 | Chang ..................... G06T 7/11 |
| 2019/0052892 | A1 | 2/2019 | Efremov et al. |
| 2020/0151964 | A1 | 5/2020 | Chen et al. |
| 2020/0379613 | A1 | 12/2020 | Dempsey et al. |
| 2021/0240489 | A1 | 8/2021 | Xie et al. |
| 2021/0256132 | A1 | 8/2021 | Lewis |

OTHER PUBLICATIONS

Kolkur, S. et al., "Human Skin Detection Using RGB, HSV and YCbCr Color Models," arXiv preprint arXiv:1708.02694., Aug. 9, 2017, pp. 324-332, vol. 137, Atlantis Press, United States.

Dhantre, P. et al., "A hybrid approach for human skin detection", 7th Int'l Conference on Communication Systems and Network Technologies, Nov. 11, 2017, pp. 142-146, IEEE, United States.

Danti, V.N. et al., "An adaptive skin color model for a human face detection," Int'l Conference on Contemporary Computing and Informatics, Nov. 27, 2014, pp. 526-532, vol. 4, IEEE, United States.

Lei, Y. et al., "An algorithm of skin detection based on texture," 4th International Congress on Image and Signal Processing, Oct. 15, 2011, pp. 1822-1825, IEEE, United States.

Kumar, A., "An empirical study of selection of the appropriate color space for skin detection: A case of face detection in color images." 2014 International Conference on Issues and Challenges in Intelligent Computing Techniques (ICICT), Feb. 7, 2014, pp. 725-730, IEEE, United States.

Huang, D-Y., et al., "Face Detection Based on Feature Analysis and Edge Detection against Skin Color-like Backgrounds," In 2010 Fourth International Conference on Genetic and Evolutionary Computing, Dec. 13, 2010, pp. 687-690, IEEE, United States.

Lv, C., et al., "Face Detection Based on Skin Color and AdaBoost Algorithm. In Applied Mechanics and Materials", Feb. 2014, pp. 1590-1594, vol. 513, Trans Tech Publications Ltd., United States.

Solanke, G.B. et al., "GPU Accelerated Computing for Human Skin Colour Detection Using YCbCr Colour Model", In 2017 International Conference on Computing, Communication, Control and Automation (ICCUBEA), Aug. 17, 2017, pp. 1-6, IEEE, United States.

Varma, S. et al., "Human skin detection using histogram processing and gaussian mixture model based on color spaces", In 2017 International Conference on Intelligent Sustainable Systems (ICISS), Dec. 7, 2017, pp. 116-120, IEEE, United States.

Kumar, A. et al., "Real-time human skin color detection algorithm using skin color map", 2nd International Conference on Computing for Sustainable Global Development (INDIACom), Mar. 11, 2015, pp. 2002-2006, IEEE, United States.

Ghomseh, A.N., et al., "Regional skin detection based on eliminating skin-like Lambertian surfaces", IEEE Symposium on Computers & Informatics, Mar. 20, 2011, pp. 307-312, IEEE, United States.

Gudadhe, Sr., "Selection & detection of skin and skin color background under complex background", International Conference on Research in Intelligent and Computing in Engineering (RICE), Aug. 22, 2018, pp. 1-3, IEEE, United States.

Wang, Y., et al., "Skin color and feature-based face detection in complicated backgrounds", International Conference on Image Analysis and Signal Processing, Oct. 21, 2011, pp. 78-83, IEEE, United States.

International Search Report and Written Opinion dated Dec. 27, 2022 for International Application PCT/KR2022/014112, from Korean Intellectual Property Office, pp. 1-6, Republic of Korea.

* cited by examiner

SKIN TONE PROTECTION USING A DUAL-CORE GEOMETRIC SKIN TONE MODEL BUILT IN DEVICE-INDEPENDENT SPACE

CROSS-REFERENCE TO RELATED APPLICATIONS

The present application claims priority to U.S. Provisional Patent Application No. 63/246,426, filed on Sep. 21, 2021, incorporated by reference in its entirety.

TECHNICAL FIELD

One or more embodiments generally relate to consumer electronics, in particular, providing skin tone protection using a dual-core geometric skin tone model built in device-independent space.

BACKGROUND

Consumer electronics/products (e.g., smart television, smartphone, etc.) are now equipped with state-of-the-art display screens (e.g., QLED, OLED) that provide ultra-high picture quality. In multimedia and broadcasting industries, visual quality enhancement (VQE) is processing of content that involves generating more vivid colors and finer delicate details in the content for presentation on a consumer electronics/products.

SUMMARY

One embodiment provides a method comprising determining one or more coordinates representing one or more skin tones in a device-independent color space. The one or more skin tones can include one or more colors of human skin captured in one or more pieces of content. The method further comprises building a dual-core geometric model based on a distribution of the one or more skin tones in the device-independent color space. The method further comprises providing the dual-core geometric model to an electronic device for use in determining a likelihood that an input color of an input content is a skin tone. The input content is adaptively enhanced, based on the likelihood, for presentation on a display connected to the electronic device.

Another embodiment provides a system comprising at least one processor and a non-transitory processor-readable memory device storing instructions that when executed by the at least one processor causes the at least one processor to perform operations. The operations include determining one or more coordinates representing one or more skin tones in a device-independent color space. The one or more skin tones can include one or more colors of human skin captured in one or more pieces of content. The operations further include building a dual-core geometric model based on a distribution of the one or more skin tones in the device-independent color space. The operations further include providing the dual-core geometric model to an electronic device for use in determining a likelihood that an input color of an input content is a skin tone. The input content is adaptively enhanced, based on the likelihood, for presentation on a display connected to the electronic device.

One embodiment provides a non-transitory processor-readable medium that includes a program that when executed by a processor performs a method comprising determining one or more coordinates representing one or more skin tones in a device-independent color space. The one or more skin tones can include one or more colors of human skin captured in one or more pieces of content. The method further comprises building a dual-core geometric model based on a distribution of the one or more skin tones in the device-independent color space. The method further comprises providing the dual-core geometric model to an electronic device for use in determining a likelihood that an input color of an input content is a skin tone. The input content is adaptively enhanced, based on the likelihood, for presentation on a display connected to the electronic device.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

Figure 1:
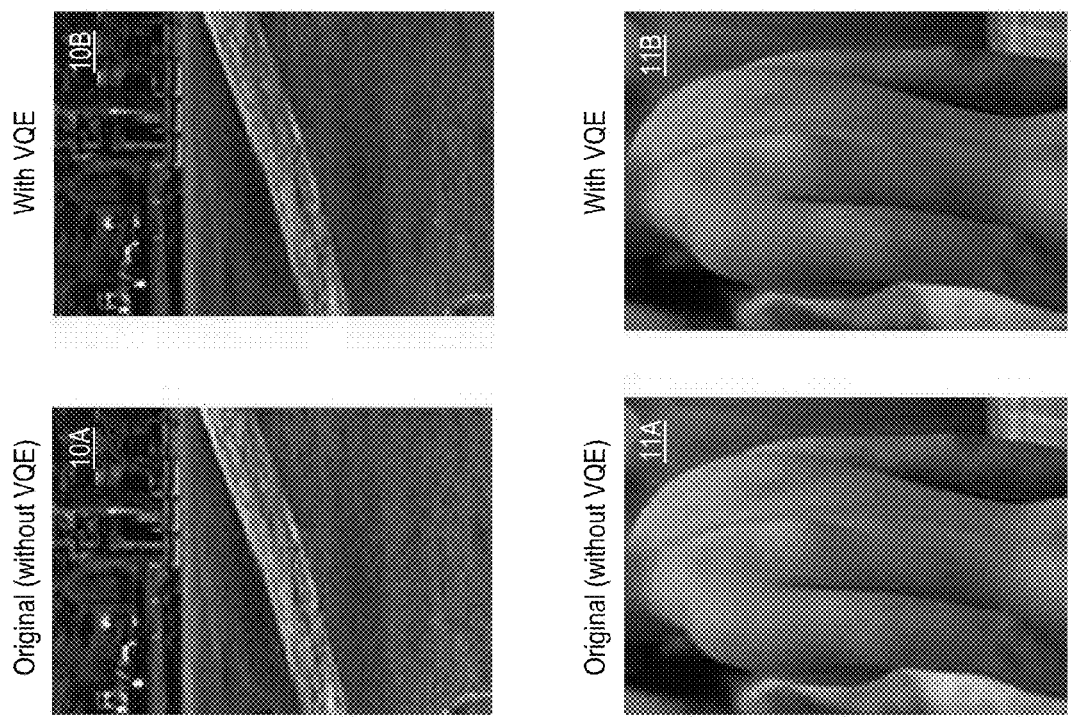
FIG. 1 illustrates visual differences between content that captures skin tones and content that does not capture skin tones after visual quality enhancement (VQE)

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to consumer electronics, in particular, providing skin tone protection using a dual-core geometric skin tone model built in device-independent space. One embodiment provides a method comprising determining one or more coordinates representing one or more skin tones in a device-independent color space. The one or more skin tones can include one or more colors of human skin captured in one or more pieces of content. The method further comprises building a dual-core geometric model based on a distribution of the one or more skin tones in the device-independent color space. The method further comprises providing the dual-core geometric model to an electronic device for use in determining a likelihood that an input color of an input content is a skin tone. The input content is adaptively enhanced, based on the likelihood, for presentation on a display connected to the electronic device.

Another embodiment provides a system comprising at least one processor and a non-transitory processor-readable memory device storing instructions that when executed by the at least one processor causes the at least one processor to perform operations. The operations include determining one or more coordinates representing one or more skin tones in a device-independent color space. The one or more skin tones can include one or more colors of human skin captured in one or more pieces of content. The operations further include building a dual-core geometric model based on a distribution of the one or more skin tones in the device-independent color space. The operations further include providing the dual-core geometric model to an electronic device for use in determining a likelihood that an input color of an input content is a skin tone. The input content is adaptively enhanced, based on the likelihood, for presentation on a display connected to the electronic device.

One embodiment provides a non-transitory processor-readable medium that includes a program that when executed by a processor performs a method comprising determining one or more coordinates representing one or more skin tones in a device-independent color space. The one or more skin tones can include one or more colors of human skin captured in one or more pieces of content. The method further comprises building a dual-core geometric model based on a distribution of the one or more skin tones in the device-independent color space. The method further comprises providing the dual-core geometric model to an electronic device for use in determining a likelihood that an input color of an input content is a skin tone. The input content is adaptively enhanced, based on the likelihood, for presentation on a display connected to the electronic device.

For expository purposes, the terms "consumer display device", "consumer display", and "consumer product" are used interchangeably in this specification.

The International Commission on Illumination (CIE) creates international standards related to light and color. In 1931, the CIE created the perceptually non-uniform CIE 1931 XYZ color space, which is an international standard that defines quantitative links between distributions of wavelengths in the electromagnetic visible spectrum and physiologically perceived colors in human color vision. The CIE 1931 xyY color space is derived from CIE 1931 XYZ color space. As all computations in CIE 1931 color spaces are linear, such color spaces are economical (i.e., decrease computational complexity and in turn costs).

For expository purposes, the term "CIE 1931 space" and "CIE 1931 xyY color space" are used interchangeably in this specification.

Visual quality enhancement (VQE) may seriously damage perceptual quality of content capturing skin tone. As humans are familiar with skin tones, the human vision system (HVS) is very sensitive to skin tones. In broadcasting and multimedia industries, high-dynamic range (HDR) display devices (e.g., big screen televisions) and wide-color gamut (WCG) display devices have become more popular over time. On HDR and WCG display devices, high performance VQE becomes more challenging when rendering different content from different sources, such as low resolution (e.g., SDR) narrow color gamut content for online streaming, self-made media, HDR and WCG content from studios, etc. Color enhancing of content that does not include skin tones typically generates visually pleasing and vivid colors. Due to the sensitivities of the HVS to skin tones, even a small amount of color enhancing of content that includes skin tones may generate visually oversaturated skin tones. For example, delicate detail boosting may lead to very fine visual effects when applied to content that does not include skin tones, but may lead to high visual impacts in skin tones when applied to content that includes skin tones (e.g., visual impacts such as skin wrinkles, overly tanned effect where skin appears overly tanned, burning effect where skin appears burnt, hue shifting effect where hue of skin color changes, etc.), thereby damaging visual quality of such content. In high quality HDR broadcasting and multimedia streaming, conventional VQE solutions do not provide reliable or feasible skin tone detection and skin tone protection in real-world applications. For example, existing content feature based methods, such as eye-mouth model based detection methods, are computationally expensive and are unsuitable for commercial applications like UHD TVs and WCG TVs. Furthermore, such content feature-based methods cause misdetections around detected skin region boundaries that may lead to temporal instability, such as high visual impacts in image sequence/video rendering. As another example, while there are existing color feature based methods that are more economical and more feasible for most commercial applications, such methods are in device-dependent color space (e.g., RGB, YCbCr) are sensitive to source gamut of content, such that the same skin colors may be presented differently on different display devices due to differences in color gamut. Therefore, existing color feature based methods are not robust enough and may result in spatial discontinuity as a result of high detection errors in neighboring pixels that greatly decrease effects of skin tone protection and may cause banding and spot artifacts.

FIG. 1 illustrates visual differences between content that captures skin tones and content that does not capture skin tones after VQE. As shown in FIG. 1, applying color enhancing to content 10A that does not capture skin tones typically generates content 10B with visually pleasing and vivid colors. As further shown in FIG. 1, applying color enhancing to content 11A that captures skin tones may generate content 11B with visually oversaturated skin tones (e.g., overly tanned effect where skin appears overly tanned).

One or more embodiments provide an effective, economic (i.e., low-cost), and hardware friendly system for high-performance VQE that includes reliable and feasible skin tone protection in commercial applications including consumer products (e.g., UHD TVs, tablets, smart phones, etc.). The skin tone protection provided is robust enough for different skin tones of different human races, such that different pixels are discriminatively processed, resulting in content with no visible artifacts (e.g., banding, spot artifacts, mosaic, etc.).

In one embodiment, the system provides a skin tone model that models skin tones in a device-independent space (e.g., CIE 1931 space). The skin tone model is universal in different applications with different types of devices, thereby increasing robustness of skin tone protection, and decreasing costs of skin tone protection in consumer products as manufacturers of these products need not customize for different color gamuts.

In one embodiment, the system models skin tones as a uniform geometric solid in either high-dimensional space or low-dimensional space. The solid is represented as a dual-core polygon covering a wide variety of skin features, thereby increasing robustness of skin tone protection for different skin tones of different human races and decreasing hardware costs due as the solid provides universal processing for the different skin tones. By comparison, conventional solutions directly model skin tones in a color scale or a color intensity domain and are less robust as these solutions must adopt multiple non-discontinuous ranges to cover various skin tones of various human races due to differences in color intensities of the skin tones, resulting in higher costs in hardware implementations.

In one embodiment, the system provides skin tone protection based on geometric features, such as color distance, to obtain artifact-free and visually natural and smooth enhanced colors. By comparison, conventional technologies provide skin tone protection based on thresholding of scales/color intensities which cannot generate continuously varying skin tones, resulting in banding or spot artifacts.

Figure 2:
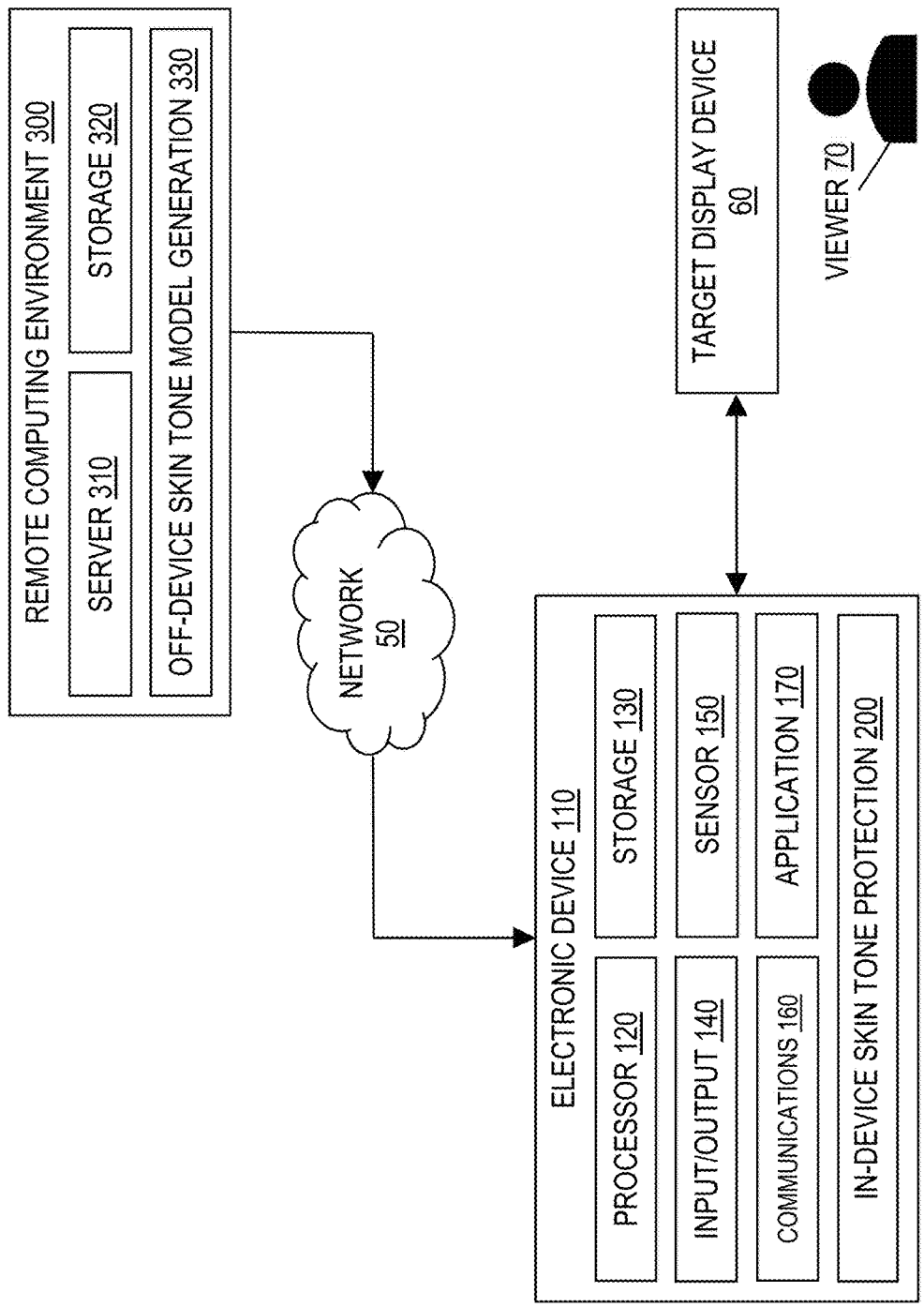
FIG. 2 illustrates an example computing architecture for implementing skin tone protection, in one or more embodiments.

FIG. 2 illustrates an example computing architecture 100 for implementing skin tone protection, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include an in-device skin tone protection system 200 configured for in-device processing. In one embodiment, the in-device processing includes implementing skin tone protection of content for presentation on a display device (e.g., a high dynamic range (HDR) rendering display) 60 integrated in or coupled to the electronic device 110. As described in detail later herein, the skin tone protection system 200 is configured to: (1) receive, as input, content (e.g., a HDR video) for presentation on the display device 60, (2) determine one or more likelihoods/probabilities that one or more colors of the content are skin tones utilizing a dual-core geometric skin tone model, and (2) apply skin tone adaptive processing (e.g., VQE processing) to the content based on the one or more likelihoods/probabilities, wherein the skin tone adaptive processing protects one or more skin tones captured in the content, and resulting processed content is rendered on the display device 60. The display device 60 is a consumer display for viewing by a viewer 70.

Examples of an electronic device 110 that the display device 60 is integrated into or coupled to include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, the electronic device 110 comprises one or more sensor units 150 integrated in or coupled to the electronic device 110. In one embodiment, the one or more sensor units 150 include, but are not limited to, a camera, a microphone, a GPS, a motion sensor, etc. In one embodiment, at least one of the sensor units 150 is integrated in (i.e., pre-installed) or coupled (attached) to the display device 60.

In one embodiment, the electronic device 110 comprises one or more input/output (I/O) units 140 integrated in or coupled to the electronic device 110. In one embodiment, the one or more I/O units 140 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 140 to configure one or more parameters (e.g., pre-defined thresholds), provide user input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the display device 60. The communications unit 160 is further configured to exchange data with a remote computing environment 300 (e.g., receiving content from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications that provide higher-level services may execute/operate on the remote computing environment 300 utilizing the resources of the remote computing environment 300. In one embodiment, the one or more applications on the remote computing environment 300 include an off-device skin tone model generation system 330 configured to provide off-device processing. As described in detail later herein, the off-device processing includes building a dual-core geometric skin tone model, wherein the resulting model is deployed on the electronic device 110 for use during the in-device processing.

In one embodiment, the remote computing environment 300 provides an online platform for hosting one or more online services (e.g., a video streaming service, etc.) and/or distributing one or more software mobile applications 170. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 3:
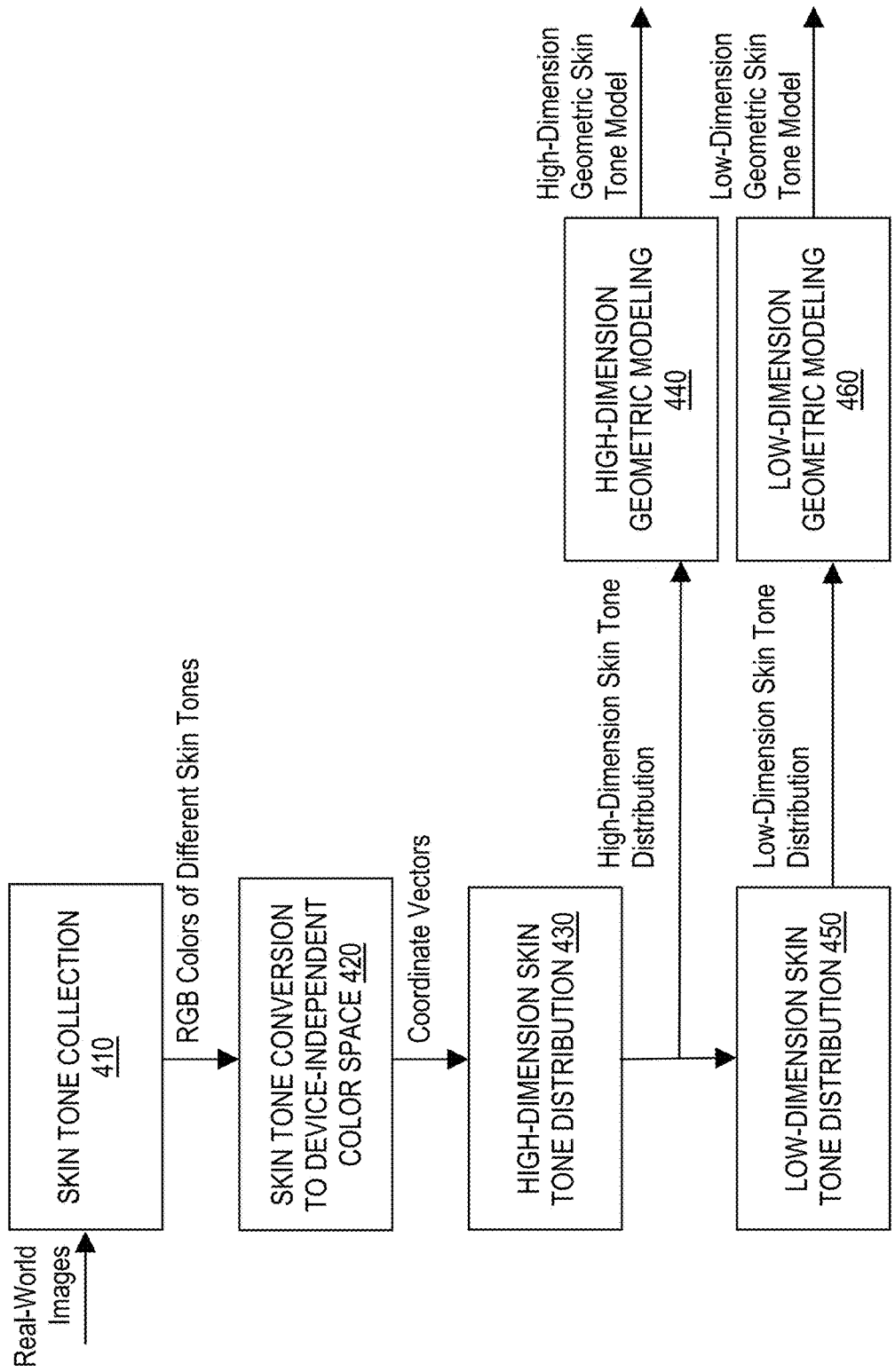
FIG. 3 illustrates an off-device skin tone model generation system, in one or more embodiments.

FIG. 3 illustrates an off-device skin tone model generation system 400, in one or more embodiments. In one embodiment, the off-device skin tone model generation system 400 is deployed at a remote computing environment 300. For example, the off-device skin tone model generation system 400 is integrated into, or implemented as part of, the off-device skin tone model generation system 330 in FIG. 2.

In one embodiment, the off-device skin tone model generation system 400 comprises a skin tone collection unit 410 configured to: (1) receive a plurality of pieces of content, wherein the pieces of content capture a wide variety of different skin tones, and (2) collect a dataset representing the different skin tones. In one embodiment, the dataset comprises, for each skin tone represented by the dataset, a red, green, blue (RGB) color of the skin tone. In one embodiment, the dataset is collected by applying an image segmentation algorithm to each of the pieces of content to segment one or more skin tones from other colors in the content.

In one embodiment, the pieces of content represent a wide variety of real-world content from different sources (e.g., from broadcasting industries, streaming services, social media, self-made media, etc.), wherein the pieces of content have different formats including different color gamuts and different types of code value encoding (e.g., HDR content, WCG content, SDR content with narrow color gamut). For example, in one embodiment, the pieces of content include thousands of real-world images capturing different subjects, having different levels of illuminance, having different color gamuts, and color graded using different Electro-Optical Transfer Functions (EOTFs). The pieces of content represent millions of pixels of skin tones available for skin tone modeling. In one embodiment, the dataset represents colors of almost all available skin tones.

In one embodiment, the off-device skin tone model generation system 400 comprises a skin tone conversion to device-independent space unit 420 configured to: (1) receive a dataset representing different skin tones (e.g., from the skin tone collection unit 410), and (2) for each skin tone represented by the dataset, convert the skin tone to at least one device-independent space, such that the skin tone has a corresponding coordinate vector in the at least one device-independent space.

For example, in one embodiment, the skin tone conversion to device-independent space unit 420 is configured to convert/transfer a RGB color of a pixel representing a particular skin tone in RGB color space to a converted color representing the pixel in CIE 1931 xyY color space. A converted color representing a pixel in CIE 1931 xyY color space has a corresponding coordinate vector [x, y, Y] in CIE 1931 xyY color space, wherein (x, y) are coordinates in chromaticity, and Y is brightness. The skin tone conversion to device-independent space unit 420 provides, for each skin tone represented by the dataset, a corresponding coordinate vector in CIE 1931 xyY color space.

In another embodiment, a device-independent space different from CIE 1931 xyY color space is utilized instead.

In one embodiment, the off-device skin tone model generation system 400 comprises a high-dimension skin tone distribution unit 430 configured to: (1) receive coordinate vectors corresponding to different skin tones (e.g., from the skin tone conversion to device-independent space unit 420), wherein the coordinate vectors are in a device-independent space (e.g., CIE 1931 space), (2) model the coordinate vectors as high-dimension random variable vectors, and (3) compute a probability density function (pdf) of the high-dimension random variable vectors, wherein the pdf represents a high-dimension distribution of the different skin tones ("high-dimension skin tone distribution"). For example, in one embodiment, if the coordinate vectors are in CIE 1931 xyY color space, the high-dimension skin tone distribution unit 430 computes the pdf as p(x, y, Y), wherein (x, y) are coordinates in chromaticity, and Y is brightness.

In one embodiment, the off-device skin tone model generation system 400 comprises a high-dimension geometric modeling unit 440 configured to: (1) receive a pdf representing a high-dimension skin tone distribution (e.g., from the high-dimension skin tone distribution unit 430), and (2) build, based on the pdf, a high-dimension statistic model that models different skin tones ("high-dimension skin tone statistic model"). In one embodiment, the high-dimension skin tone statistic model is a high-dimension (e.g., 3D) geometric skin tone model in device-independent space (e.g., a 3D geometric solid in CIE 1931 space). In one embodiment, the high-dimension skin tone statistic model is a high-dimension dual-core geometric skin tone model (e.g., a dual-core polygon-based model having multiple vertices).

As described in detail later herein, the high-dimension skin tone statistic model may be used to estimate/predict a likelihood/probability that an arbitrary color is a skin tone. The high-dimension skin tone statistic model estimates/predicts a likelihood/probability that an arbitrary color is a skin tone based on probabilities of different colors beings skin tones (from the high-dimension skin tone distribution). Unlike conventional skin tone models that provide a binary decision, providing a likelihood/probability that an arbitrary color is a skin tone reduces or eliminates high visual impacts (e.g., banding and spot artifacts) in VQE. The high-dimension skin tone statistic model is very accurate but as the high-dimension skin tone statistic model requires high-dimension processing which may be costly, the high-dimension skin tone statistic model is more suitable for use in high-end consumer products with ample computing resources.

In one embodiment, the off-device skin tone model generation system 400 comprises a low-dimension skin tone distribution unit 450 configured to: (1) receive a pdf representing a high-dimension skin tone distribution (e.g., from the high-dimension skin tone distribution unit 430), and (2) compute a marginal distribution of the pdf, wherein the marginal distribution represents a low-dimension (e.g., 2D) distribution of different skin tones ("low-dimension skin tone distribution"). For example, in one embodiment, the low-dimension skin tone distribution unit 450 computes the marginal distribution in accordance with equation (1) provided below:

$$P_{x,y}(x,y) = \int_0^1 p(x,y,Y)dY \qquad (1),$$

wherein $p_{x,y}(x, y)$ is the marginal distribution in CIE 1931 space, $p(x, y, Y)$ is the pdf in p CIE 1931 xyY color space, and brightness Y is normalized to range [0, 1].

In one embodiment, the off-device skin tone model generation system 400 comprises a low-dimension geometric modeling unit 460 configured to: (1) receive a marginal distribution representing a low-dimension skin tone distribution (e.g., from the low-dimension skin tone distribution unit 450), and (2) build, based on the marginal distribution, a low-dimension statistic model that models different skin tones ("low-dimension skin tone statistic model"). In one embodiment, the low-dimension skin tone statistic model is a low-dimension (e.g., 2D) geometric skin tone model in device-independent space (e.g., CIE 1931 space). In one embodiment, the low-dimension skin tone statistic model is a low-dimension dual-core geometric skin tone model (e.g., a dual-core quadrilateral-based model).

As described in detail later herein, the low-dimension skin tone statistic model may be used to estimate/predict a likelihood/probability that an arbitrary color is a skin tone. The low-dimension skin tone statistic model estimates/predicts a likelihood/probability that an arbitrary color is a skin tone based on probabilities of different colors beings skin tones (from the low-dimension skin tone distribution). Unlike conventional skin tone models that provide a binary decision, providing a likelihood/probability that an arbitrary color is a skin tone reduces or eliminates high visual impacts (e.g., banding and spot artifacts) in VQE.

The high-dimension skin tone statistic model is more accurate than the low-dimension skin tone statistic model because the high-dimension skin tone statistic model factors into account brightness. The high-dimension skin tone statistic model is more costly than the low-dimension skin tone statistic model because high-dimension processing may be expensive (i.e., requires more computation resources). As such, the low-dimension skin tone statistic model is more suitable for use in common or low-end consumer products as the low-dimension skin tone statistic model requires low-dimension processing which is less costly.

Figure 4:
FIG. 4 illustrates some example real-world images the off-device skin tone model generation system may utilize for skin tone modeling, in one or more embodiments.

FIG. 4 illustrates some example real-world images the off-device skin tone model generation system 400 may utilize for skin tone modeling, in one or more embodiments. As shown in FIG. 4, the real-world images capture subjects with different skin tones.

Figure 5:
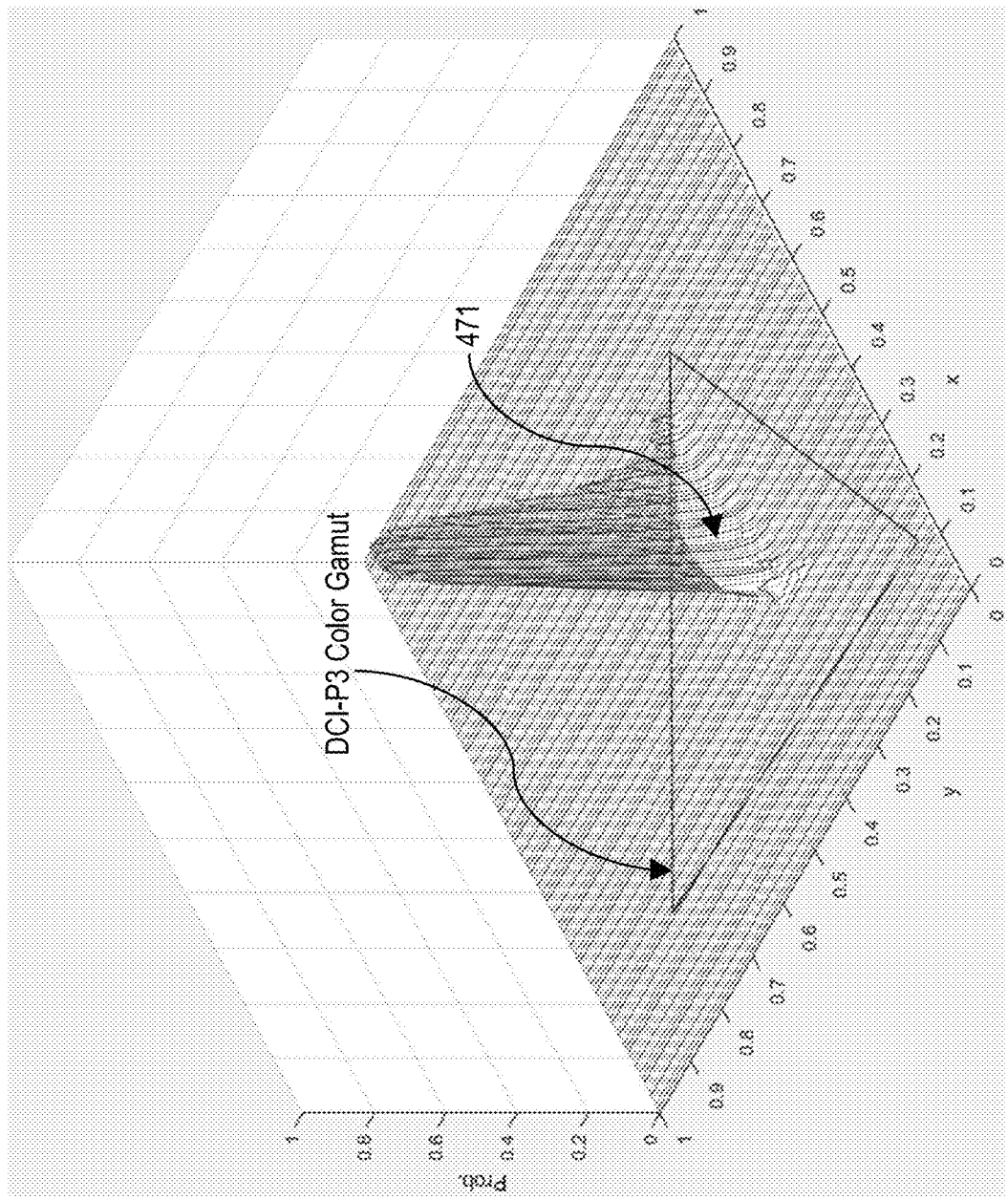
FIG. 5 is a graph illustrating an example marginal distribution in International Commission on Illumination (CIE) 1931 space, in one or more embodiments.

FIG. 5 is a graph 470 illustrating an example marginal distribution $p_{x,y}(x, y)$ in CIE 1931 space, in one or more embodiments. A first horizontal axis of the graph 470 represents a x-coordinate in chromaticity. A second horizontal axis of the graph 470 represents a y-coordinate in chromaticity. A vertical axis of the graph 470 represents probability. The marginal distribution $p_{x,y}(x, y)$ represents a low-dimension skin tone distribution.

As shown in FIG. 5, all of different skin tones cluster into a relatively small, irregular, single region 471 in CIE 1931 space, making it convenient to build (e.g., via the low-dimension geometric modeling unit 460) an accurate, low-cost, and effective low-dimension skin tone statistic model for commercial applications. Unlike the marginal distribution $p_{x,y}(x, y)$, skin tone models built in device-dependent spaces such as RGB or YCbCr represent skin tone distributions that are scattered across multiple segments or regions, causing difficulties in accurately modeling skin tones.

In one embodiment, the off-device skin tone model generation system 400 builds a low-dimension dual-core geometric skin tone model as follows: First, the off-device skin tone model generation system 400 quantizes a visible color plane of a device-independent space (e.g., CIE 1931 space) into multiple, small color patches. Let $\Omega_k$ generally denote a color patch, wherein k is an index of the color patch. In one embodiment, each color patch $\Omega_k$ is small enough such that a maximum color distance within each color patch $\Omega_k$ is less than or equal to a just-noticeable color difference (JND). A color patch $\Omega_k$ may be considered as a good representation of a given color as a JND between colors inside the color patch $\Omega_k$ is small enough.

Second, the off-device skin tone model generation system 400 computes, for each color patch $\Omega_k$, based on the marginal distribution $p_{x,y}(x, y)$, a corresponding accumulative likelihood/probability that colors in the color patch $\Omega_k$ are skin tones, in accordance with equation (2) provided below:

$$P_k = \iint_{\Omega_k} p_{x,y}(x,y,Y)dxdy \qquad (2).$$

Many colors in the device-independent space have either a zero or a very low likelihood/probability that the colors are skin tones. For each color in the device-independent space that has either a zero or a very low likelihood/probability that the color is a skin tone, the off-device skin tone model generation system 400 sets a likelihood/probability that the color is a skin tone to zero.

Third, the off-device skin tone model generation system 400 focuses on colors that have a relatively high likelihood/probability that the colors are skin tones (e.g., the likelihood/probability exceeds a pre-determined threshold) by clustering these colors. The resulting colors clustered form the small, irregular, single region 471 in CIE 1931 space. Likelihoods/probabilities that colors are skin tones increases from colors near the boundaries of the region 471 to the center of the region 471.

Specifically, the off-device skin tone model generation system 400 groups colors in the region 471 into two groups of colors: (1) a first group of colors clustered/distributed around the center of the region 471, wherein the first group of colors have very high likelihoods/probabilities that the colors are skin tones, and (2) a second group of colors clustered/distributed near the boundaries of the region 471, wherein the second group of colors have relatively high likelihoods/probabilities that the colors are skin tones. The two groups of colors allow the off-device skin tone model generation system 400 to build the dual-core geometric skin tone model that avoids estimating/predicting binary decisions. The first group of colors form an inner core $R_s^i$ of the dual-core geometric skin tone model, and the second group of colors form an outer core $R_s^o$ of the dual-core geometric skin tone model. The inner core $R_s^i$ is determined by probabilities of different colors beings skin tones (from the low-dimension skin tone distribution, colors that have very high likelihoods/probabilities that the colors are skin tones). The outer core $R_s^o$ represents a color transition zone.

As shown in FIG. 5, boundaries of the region 471 are complex curves. Further, based on equations (1) and (2) provided above, boundaries of both the inner core $R_s^i$ and the outer core $R_s^o$ are complex curves. Curves, however, are non-linear and hardware implementations of non-linear modeling is computationally expensive. In one embodiment, the off-device skin tone model generation system 400 linearizes the boundaries ("boundary linearization") of the region 471 to obtain a linear region $R_S$ represented by lines. Specifically, based on geometric shapes of the inner core $R_s^i$ (FIG. 6) and the outer core $R_s^o$ (FIG. 6), the off-device skin tone model generation system 400 linearizes the boundaries of both the inner core $R_s^i$ and the outer core $R_s^o$, such that the inner core $R_s^i$ and the outer core $R_s^o$ become linear geometric regions (e.g., quadrilaterals). Specifically, the linear region $R_S$ comprises the inner linear geometric region (or inner core) $R_s^i$ and the outer linear geometric region (or outer core) $R_s^o$.

The linear region $R_S$ represents the dual-core geometric skin tone model. Even though the linear region $R_S$ may not encompass all skin tones, it decreases processing costs as all computations are linear. In one embodiment, the off-device skin tone model generation system 400 builds (e.g., via the low-dimension geometric modeling unit 460) the dual-core geometric skin tone model in accordance with equation (3) provided below:

$$R_s = R_s^i \cup R_s^o \qquad (3).$$

In one embodiment, one or more perceptual constant hue loci are used as reference in boundary linearization. Specifically, vertices that define boundaries of the inner linear region $R_s^i$ and the outer linear region $R_s^o$ may be determined by referencing the perceptual constant hue loci. DCI-P3 (Digital Cinema Initiative—Protocol 3) color gamut is shown in FIGS. 5-6 for reference only.

Let $\{v_k^i\}$ generally denote a set of vertices that define boundaries of an inner core $R_s^i$, and let $\{v_k^o\}$ generally denote a set of vertices that define boundaries of an outer core $R_s^o$, wherein k is an index.

Figure 6:
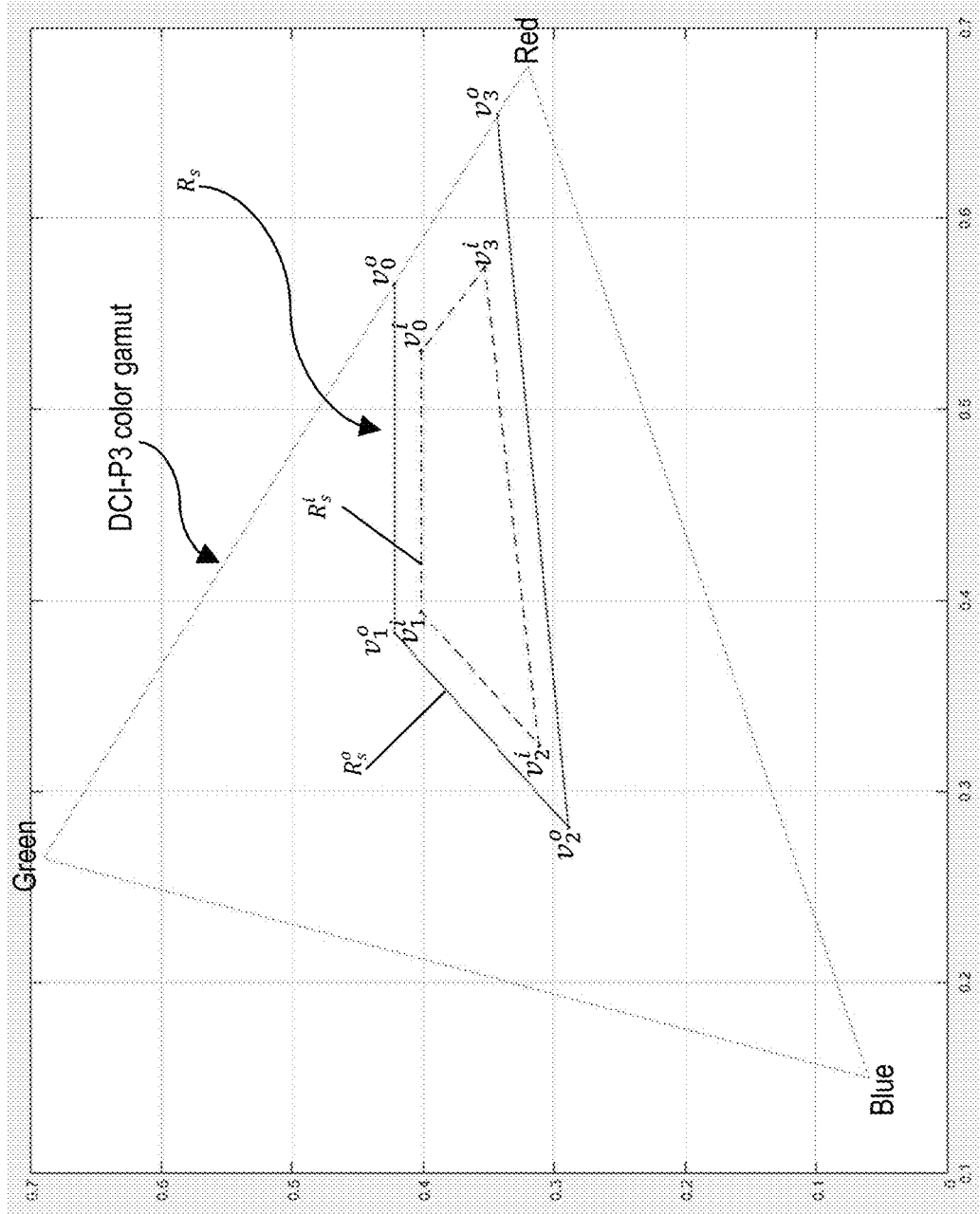
FIG. 6 is a graph illustrating an example linear region representing a low-dimension dual-core geometric skin tone model in CIE 1931 space, in one or more embodiments.

FIG. 6 is a graph 480 illustrating an example linear region $R_s$ representing a low-dimension dual-core geometric skin tone model $R_s$ in CIE 1931 space, in one or more embodiments. A horizontal axis of the graph 480 represents a x-coordinate in chromaticity. A vertical axis of the graph 480 represents a y-coordinate in chromaticity. The dual-core geometric skin tone model $R_S$ comprises an inner core (or inner linear geometric region) $R_s^i$ and an outer core (or outer linear geometric region) $R_s^o$, wherein $R_s^i$ and $R_s^o$ are quadrilaterals. Coordinates $v_0^i$, $v_1^i$, $v_2^i$, and $v_3^i$ define boundaries of the inner core $R_s^i$. Coordinates $v_0^o$, $v_1^o$, $v_2^o$, and $v_3^o$ define boundaries of the outer core $R_s^o$. In one embodiment, the vertices $v_0^i$, $v_1^i$, $v_2^i$, and $v_3^i$ and the vertices $v_0^o$, $v_1^o$, $v_2^o$, and $v_3^o$ are determined along the constant hue loci that pass the vertices according to the significance of the likelihood of skin tones.

Figure 7:
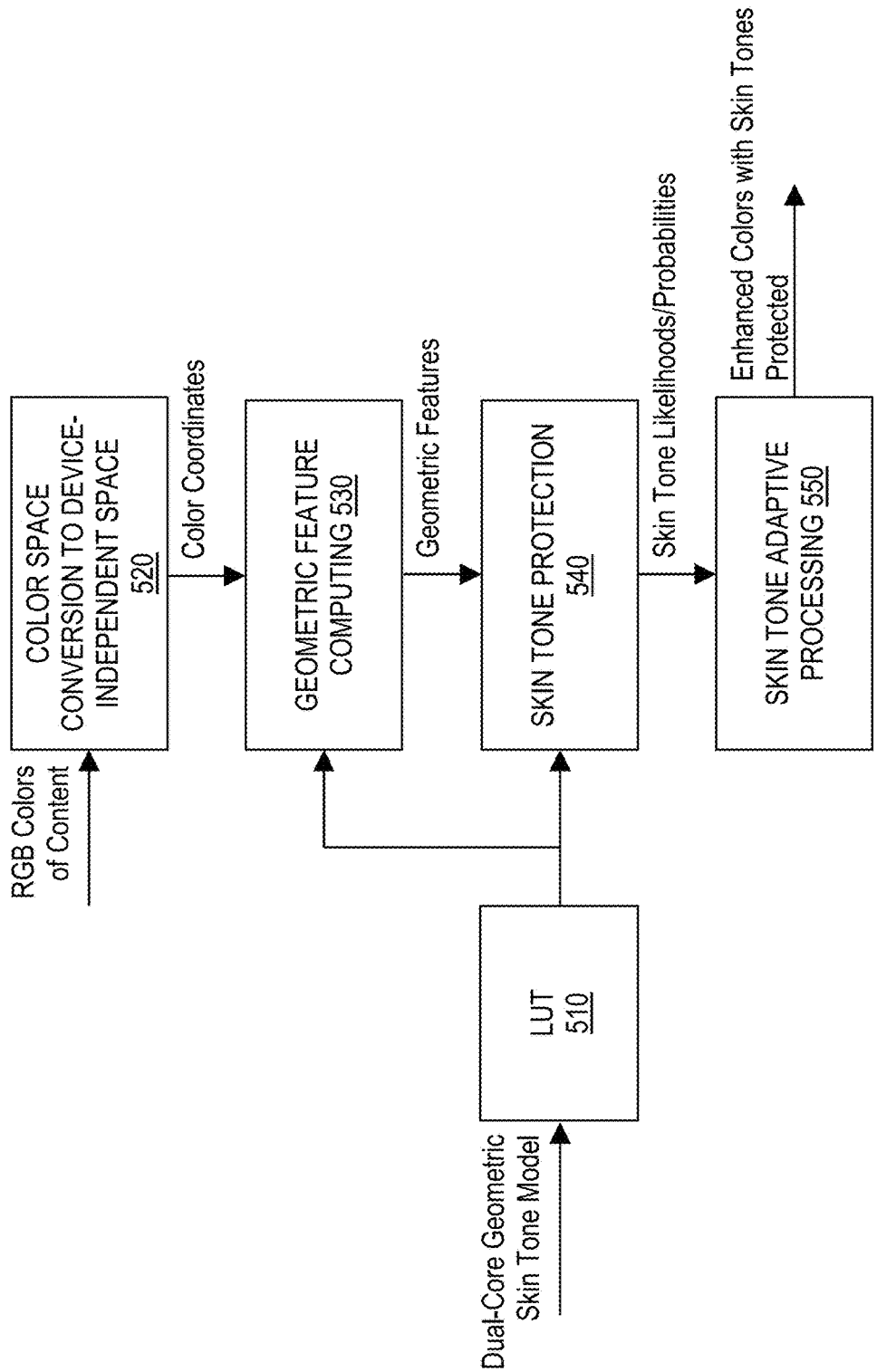
FIG. 7 illustrates an in-device skin tone protection system, in one or more embodiments.

FIG. 7 illustrates an in-device skin tone protection system 500, in one or more embodiments. In one embodiment, the in-device skin tone protection system 500 is deployed at an electronic device 110. For example, the in-device skin tone protection system 500 is integrated into, or implemented as part of, the in-device skin tone protection system 200 in FIG. 2.

In one embodiment, the in-device skin tone protection system 500 comprises a lookup table (LUT) 510 configured to maintain a dual-core geometric skin tone model $R_S$. The dual-core geometric skin tone model $R_S$ is loaded onto or downloaded to the electronic device 110 from a remote computing environment (e.g., from the off-device skin tone model generation system 330 on the remote computing environment 300 in FIG. 3). The dual-core geometric skin tone model $R_S$ is either low-dimension (e.g., built by the low-dimension geometric modeling unit 460) or high-dimension (e.g., built by the high-dimension geometric modeling unit 440) based on the market orientation of the electronic device 110. For example, if the electronic device 110 is a common or low-end consumer product, the dual-core geometric skin tone model $R_S$ is low-dimension. If the electronic device 110 is a high-end consumer product with ample computing resources, the dual-core geometric skin tone model $R_S$ is high-dimension.

In one embodiment, the in-device skin tone protection system 500 comprises a color space conversion to device-independent space unit 520 configured to: (1) receive, as input, content (e.g., a HDR video) for presentation on a display device 60 integrated in, or coupled to, the electronic device 110, and (2) for each pixel of the content, convert/transfer a RGB color of the pixel in RGB color space to a converted color representing the pixel in a device-independent space (e.g., CIE 1931 space), wherein the converted color has a corresponding coordinates ("color coordinates") in the device-independent space. For example, in one embodiment, the device-independent space is CIE 1931 xyY color space, and the converter color has a corresponding coordinate vector [x, y, Y] in CIE 1931 xyY color space. In another embodiment, a device-independent space different from CIE 1931 xyY color space is utilized instead.

In one embodiment, the in-device skin tone protection system 500 comprises a geometric feature computing unit 530 configured to: (1) receive color coordinates in device-independent space (e.g., from the color space conversion to device-independent space unit 520), wherein the color coordinates correspond to converted colors that RGB colors of content have been converted/transferred to, (2) receive a dual-core geometric skin tone model (e.g., from the LUT 510), and (3) compute one or more geometric features of the content based on the color coordinates and the dual-core geometric skin tone model. Examples of the one or more geometric features include, but are not limited to, distance of the colors of the content.

In one embodiment, the in-device skin tone protection system 500 comprises a skin tone protection unit 540 configured to: (1) receive one or more geometric features of content (e.g., from the geometric feature computing unit 530), (2) receive a dual-core geometric skin tone model (e.g., from the LUT 510), and (3) determine one or more skin tone protection measures for the content based on the geometric features and the dual-core geometric skin tone model. The one or more skin tone protection measures are continuous and content-adaptive, ensuring very natural and smooth variations between colors of the content that are skin tones and colors of the content that are not skin tones to obtain artifact-free and visually natural and smooth enhanced colors.

In one embodiment, determining the one or more skin tone protection measures include determining one or more likelihoods/probabilities that one or more colors of the content are skin tones ("skin tone likelihoods/probabilities"). The one or more skin tone protection measures include, but are not limited to, one or more coefficients/ weights corresponding to one or more of the colors of the content. As described in detail later herein, an input color (i.e., color of the content) is selectively and adaptively enhanced based on a corresponding coefficient/weight.

In one embodiment, the in-device skin tone protection system 500 comprises a skin tone adaptive processing unit 550 configured to: (1) receive one or more skin tone protection measures for content (e.g., from the skin tone protection unit 540), and (2) perform, based on the one or more skin tone protection measures, skin tone adaptive processing on the content to ensure smooth transitions between colors of the content that are skin tones and colors of the content that are not skin tones, resulting in processed content for presentation on the display device 60. In one embodiment, the skin tone adaptive processing includes, but is not limited to, VQE. As described in detail later herein, in one embodiment, in the processed content, colors that are not skin tones are enhanced, and colors that are skin tones are minimally or not enhanced to protect the skin tones, thereby avoiding high visual impacts caused by oversaturation of skin tones.

Figure 8:
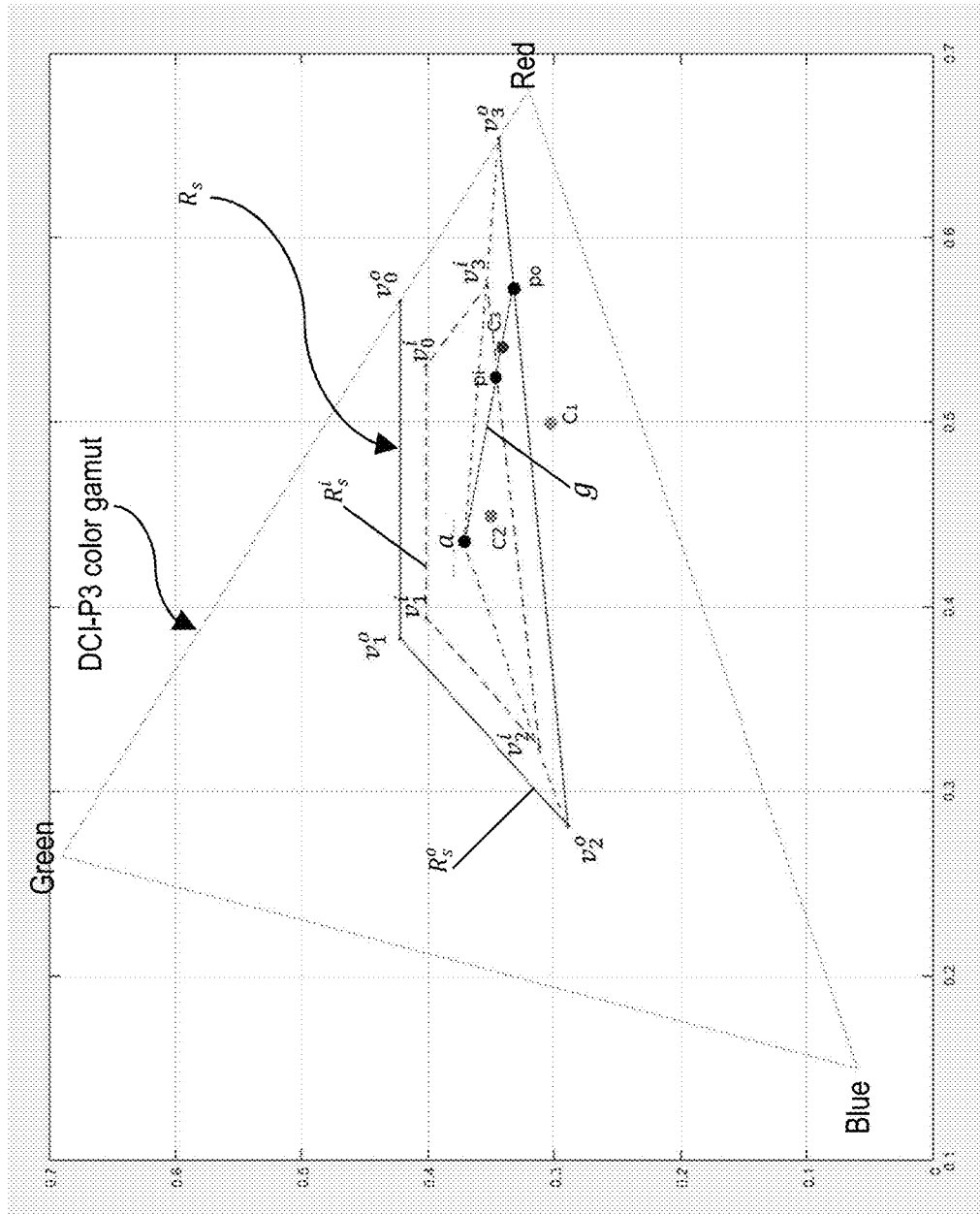
FIG. 8 is a graph illustrating use of the low-dimension dual-core geometric skin tone model in FIG. 6 to compute likelihoods/probabilities that different colors are skin tones, in one or more embodiments.

FIG. 8 is a graph 485 illustrating use of the low-dimension dual-core geometric skin tone model $R_s$ in FIG. 6 to compute likelihoods/probabilities that different colors are skin tones, in one or more embodiments. A horizontal axis of the graph 480 represents a x-coordinate in chromaticity. A vertical axis of the graph 480 represents a y-coordinate in chromaticity. As shown in FIG. 8, a first color C1 is outside the outer core $R_s^o$ of the dual-core geometric skin tone model $R_s$, a second color C2 is inside the inner core $R_s^i$ of the dual-core geometric skin tone model $R_s$, and a third color C3 is in between the inner core $R_s^i$ and the outer core $R_s^o$ of the dual-core geometric skin tone model $R_s$.

For each color that is inside the inner core $R_s^i$ (e.g., the second color C2), the dual-core geometric skin tone model $R_s$ estimates/predicts a high likelihood/probability that the color is a skin tone. In one embodiment, a likelihood/probability that a color inside the inner core $R_s^i$ is a skin tone is set to a very high likelihood/probability.

For each color that is outside the outer core $R_s^o$ (e.g., the first color C1), the dual-core geometric skin tone model $R_s$ estimates/predicts a low likelihood/probability that the color is a skin tone. In one embodiment, a likelihood/probability that a color outside the outer core $R_s^o$ is a skin tone is set either to zero or a very low likelihood/probability.

For each color that is in between the inner core $R_s^i$ and the outer core $R_s^o$ (e.g., the third color C3), the dual-core geometric skin tone model $R_s$ estimates/predicts a gradually/smoothly varying likelihood/probability that the color is a skin tone. Specifically, the closer a color that is in between the inner core $R_s^i$ and the outer core $R_s^o$ is to the inner core $R_s^i$, the higher the likelihood/probability that the color is a skin tone. By comparison, the closer a color that is in between the inner core $R_s^i$ and the outer core $R_s^o$ is to the outer core $R_s^o$, the lower the likelihood/probability that the color is a skin tone. Therefore, the dual-core geometric skin tone model $R_s$ estimates/predicts a likelihood/probability that a color that is in between the inner core $R_s^i$ and the outer core $R_s^o$ is a skin tone based on a distance between the color and the boundaries of the inner core $R_s^i$ and the outer core $R_s^o$. The dual-core geometric skin tone model $R_s$ avoids estimating/predicting binary decisions.

For an input color that is in between the inner core $R_s^i$ and the outer core $R_s^o$, a distance between the input color and the boundaries of the inner core $R_s^i$ and the outer core $R_s^o$ is based on a corresponding vector from the input color ("color varying vector"). In one embodiment, the system 500 provides an effective but low-cost solution for determining a corresponding color varying vector from an input color. As stated above, in one embodiment, a perceptual constant hue loci is used as a reference to determine the vertices $\{v_k^i\}$ and the vertices $\{v_k^o\}$ that define the boundaries of the inner core $R_s^i$ and the outer core $R_s^o$, respectively. A vector passing a pair of vertices corresponding to an input color is similar or closer to an existing constant hue locus, such as $\overline{v_k^i v_k^o}$ where $k \in [0, 3]$ if $R_s^i$ and $R_s^o$ are quadrilaterals (as shown in FIG. 6). The system 500 determines a corresponding color varying vector from an input color using the vertices $\{v_k^i\}$ and $\{v_k^o\}$, wherein the corresponding color varying vector may be approximately similar to the existing constant hue locus.

Specifically, for an input color C that is in between the inner core $R_s^i$ and the outer core $R_s^o$, the system 500 determines a corresponding color varying vector from the input color C as follows: First, the system 500 determines pairs of vertices corresponding to the input color C. Second, the system 500 defines an anchor corresponding to the input color C as the intersection of the pairs of vertices. Third, the system 500 determines a color varying path that includes the anchor and the input color C, wherein a likelihood/probability that the input color C is a skin tone will follow color varying properties along the existing constant hue locus and avoid abrupt changes, thereby preventing high visual impacts. Fourth, the system 500 determines a pair of reference points $p_i$ and $p_o$ along the color varying path, wherein a first reference point $p_i$ of the pair is an intersection of the color varying path and the boundaries of the inner core $R_s^i$, and a second reference point $p_o$ of the pair is an intersection of the color varying path and the boundaries of the outer core $R_s^o$. The corresponding color varying vector from the input color C is $\overline{p_i p_o}$.

After the system 500 determines a color varying vector $\overline{p_i p_o}$ from the input color C, the system 500 determines a likelihood/probability that the input color is a skin tone by determining a relative position r of the input color C on the color varying vector $\overline{p_i p_o}$. In one embodiment, the system 500 determines a relative position r of an input color C on a color varying vector $\overline{p_i p_o}$ in accordance with equation (4) provided below:

$$r = \frac{|p_i C|}{|p_i p_o|}. \tag{4}$$

In one embodiment, the system 500 determines a likelihood/probability that an input color C is a skin tone in accordance with equation (5) provided below:

$$l_c = l_{min} + r(l_{max} - l_{min}) \tag{5},$$

wherein $l_c$ is the likelihood/probability that the input color C is a skin tone, $l_{min}$ is a pre-determined minimum likelihood/probability value (e.g., 0), and $l_{max}$ is a pre-determined maximum likelihood/probability value (e.g., 1).

For example, referring back to FIG. 8, the system 500 determines a color varying vector from the third color C3 as follows: (1) the system 500 determines $\overline{v_2^i v_2^o}$ and $\overline{v_3^i v_3^o}$ as pairs of vertices corresponding to the third color C3, (2) the system 500 defines the intersection of $\overline{v_2^i v_2^o}$ and $\overline{v_3^i v_3^o}$ as an anchor a corresponding to the third color C3, (3) the system 500 determines a color varying path g that includes the anchor a and the third color C3, and (4) the system 500 determines reference points $p_i$ and $p_o$ along the color varying path g, wherein the reference point $p_i$ is an intersection of the color varying path g and the boundaries of the inner core $R_s^i$, and the reference point $p_o$ is an intersection of the color varying path g and the boundaries of the outer core $R_s^o$. The color varying vector from the third color C3 is $\overline{p_i p_o}$.

Likelihoods/probabilities that colors are skin tones estimated/predicted by the dual-core geometric skin tone model vary gradually/smoothly. In one embodiment, skin tone adaptive processing implemented by the system 500 (e.g., via the skin tone adaptive processing unit 550) adaptively adopts color enhancing of input colors (i.e., colors of content) and/or details based on likelihoods/probabilities that the input colors are skin tones, thereby protecting skin tones and ensuring that resulting enhanced colors are smooth and visually pleasing to the HVS.

In one embodiment, to ensure smooth transitions during skin tone adaptive processing (e.g., VQE) between colors of content that are skin tones and colors of the content that are not skin tones, the system 500 selectively and adaptively enhances an input color (i.e., color of the content) and/or a detail based on a likelihood/probability that the input color is a skin tone. The system 500 utilizes skin tone likelihoods/probabilities as a reference in perceptual color enhancing, thereby avoiding high visual impacts caused by oversaturation of skin tones.

In one embodiment, the system 500 provides a high level of skin tone protection for input colors inside the inner core $R_s^i$. For example, in one embodiment, the system 500 enhances an input color that is inside the inner core $R_s^i$ with a small coefficient/weight corresponding to the input color (e.g., included in a skin tone protection measure from the skin tone protection unit 540). As another example, in one embodiment, the system 500 does not enhance an input color that is inside the inner core $R_s^i$, i.e., a coefficient/weight corresponding to the input color is zero (e.g., included in a skin tone protection measure from the skin tone protection unit 540).

In one embodiment, the system 500 provides a low level of skin tone protection for input colors outside the outer core $R_s^o$. For example, in one embodiment, the system 500 enhances an input color that is outside the outer core $R_s^i$ with a large coefficient/weight corresponding to the input color (e.g., included in a skin tone protection measure from the skin tone protection unit 540).

In one embodiment, the system 500 provides gradually/smoothly varying levels of skin tone protection for input colors in between the inner core $R_s^i$ and the outer core $R_s^o$. For example, in one embodiment, the system 500 enhances an input color in between the inner core $R_s^i$ and the outer core $R_s^o$ with a coefficient/weight corresponding to the input color (e.g., included in a skin tone protection measure from the skin tone protection unit 540), wherein the coefficient/weight is based on a distance between the input color and the boundaries of the inner core $R_s^i$ and the outer core $R_s^o$, and the coefficient/weight gradually/smoothly increases the closer the input color is to the outer core $R_s^o$.

Figure 9:
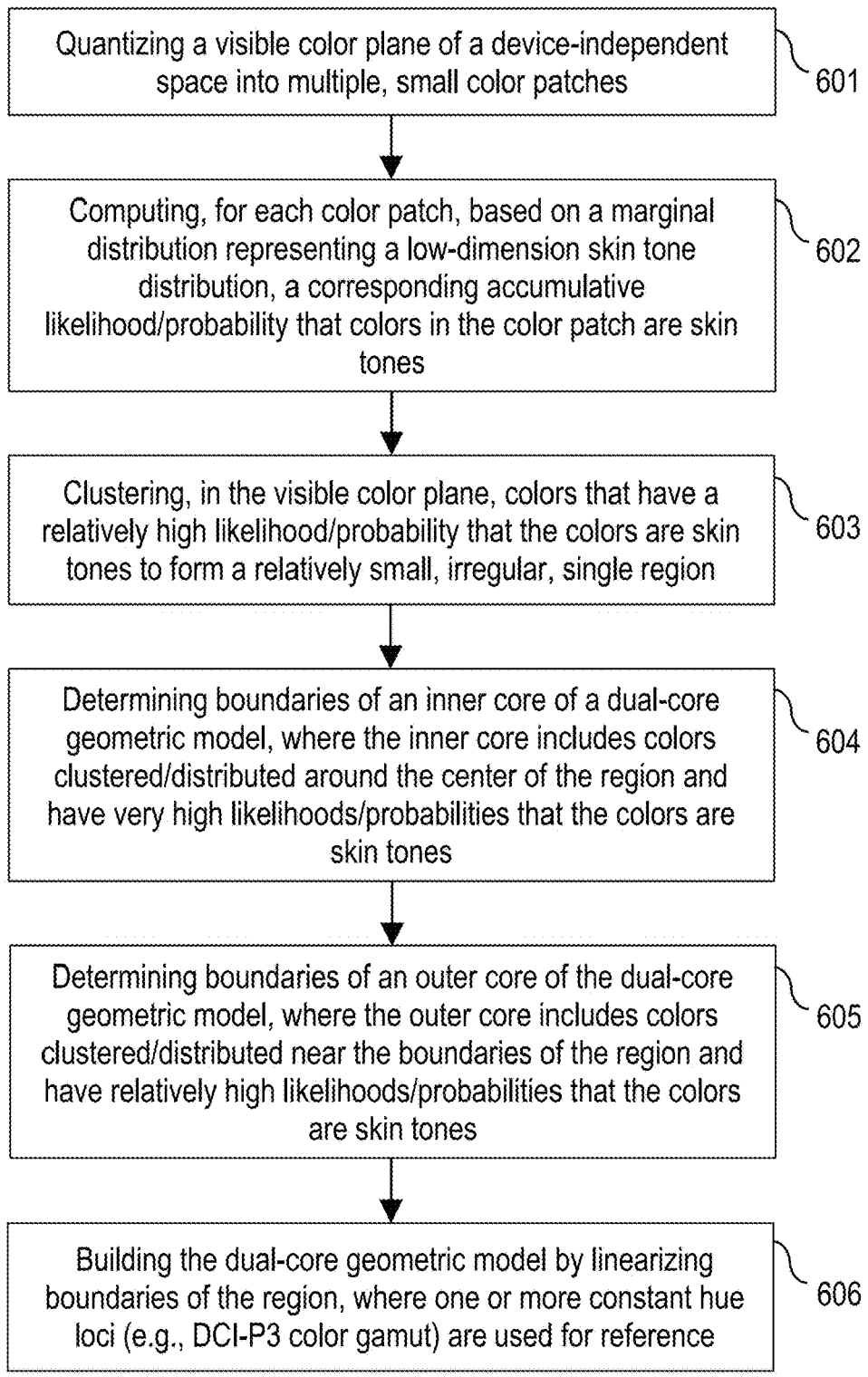
FIG. 9 is a flowchart of an example process for building a dual-core geometric skin tone model, in one or more embodiments.

FIG. 9 is a flowchart of an example process 600 for building a dual-core geometric skin tone model, in one or more embodiments. Process block 601 includes quantizing a visible color plane of a device-independent space (e.g., CIE 1931 space) into multiple, small color patches (e.g., $\Omega_k$). Process block 602 includes computing, for each color patch, based on a marginal distribution representing a low-dimension skin tone distribution, a corresponding accumulative likelihood/probability that colors in the color patch are skin tones. Process block 603 includes clustering, in the visible color plane, colors that have a relatively high likelihood/probability that the colors are skin tones to form a relatively small, irregular, single region. Process block 604 includes determining boundaries of an inner core of a dual-core geometric skin tone model, where the inner core includes colors clustered/distributed around the center of the region and have very high likelihoods/probabilities that the colors are skin tones. Process block 605 includes determining boundaries of an outer core of the dual-core geometric skin tone model, where the outer core includes colors clustered/distributed near the boundaries of the region and have relatively high likelihoods/probabilities that the colors are skin tones. Process block 606 includes building the dual-core geometric skin tone model by linearizing boundaries of the region, where one or more constant hue loci are used for reference.

In one embodiment, process blocks 601-606 may be performed by one or more components of the off-device skin tone model generation system 400, such as the low-dimension geometric modeling unit 460.

Figure 10:
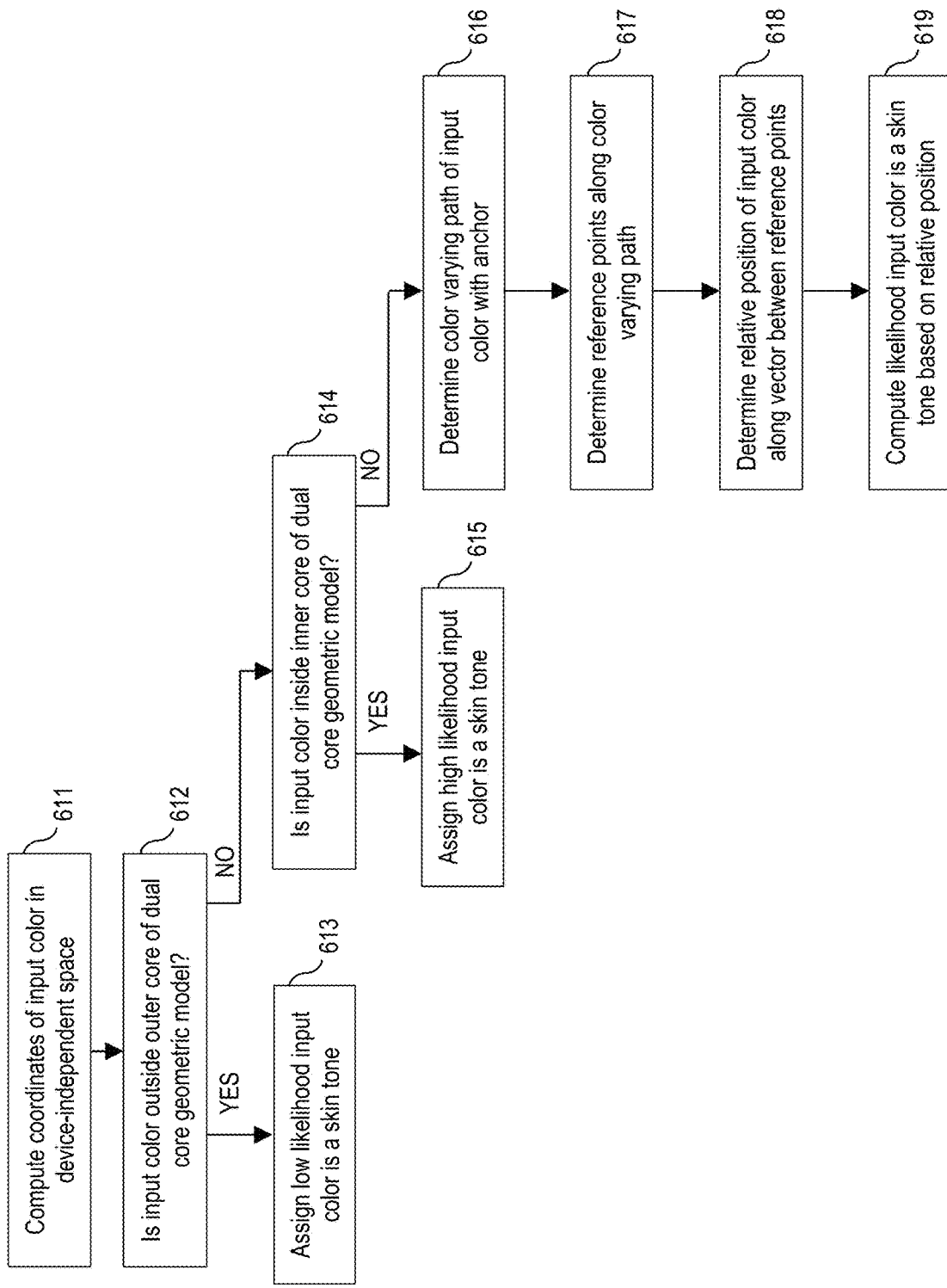
FIG. 10 is a flowchart of an example process for determining a likelihood that an input color is a skin tone, in one or more embodiments.

FIG. 10 is a flowchart of an example process 610 for determining a likelihood that an input color is a skin tone, in one or more embodiments. Process block 611 includes computing coordinates of an input color (e.g., input color C) in a device-independent space (e.g., CIE 1931 space). Process block 612 determining whether the input color is outside an outer core (e.g., $R_s^o$) of a dual-core geometric skin tone model (e.g., $R_S$). If the input color is outside the outer core, proceed to process block 613. If the input color is not outside the outer core, proceed to process block 614.

Process block 613 includes assigning a low likelihood/probability that the input color is a skin tone.

Process block 614 includes determining whether the input color is inside an inner core (e.g., $R_s^i$) of the dual-core geometric skin tone model. If the input color is inside the inner core, proceed to process block 615. If the input color is not inside the inner core, proceed to process block 616.

Process block 615 includes assigning a high likelihood/probability that the input color is a skin tone.

Process block 616 includes determining a color varying path (e.g., g) of the input color with an anchor (e.g., a). Process block 617 includes determining reference points (e.g., $p_i$ and $p_o$) along the color varying path. Process block 618 includes determining a relative position (e.g., r) of the input color along a color varying vector between the reference points (e.g., $\overline{p_i p_o}$) (e.g., in accordance with equation (4)). Process block 619 includes computing a likelihood/probability that the input color is a skin tone based on the relative position (e.g., in accordance with equation (5)).

In one embodiment, process blocks 611-619 may be performed by one or more components of the in-device skin tone protection system 500, such as the skin tone protection unit 540.

Figure 11:
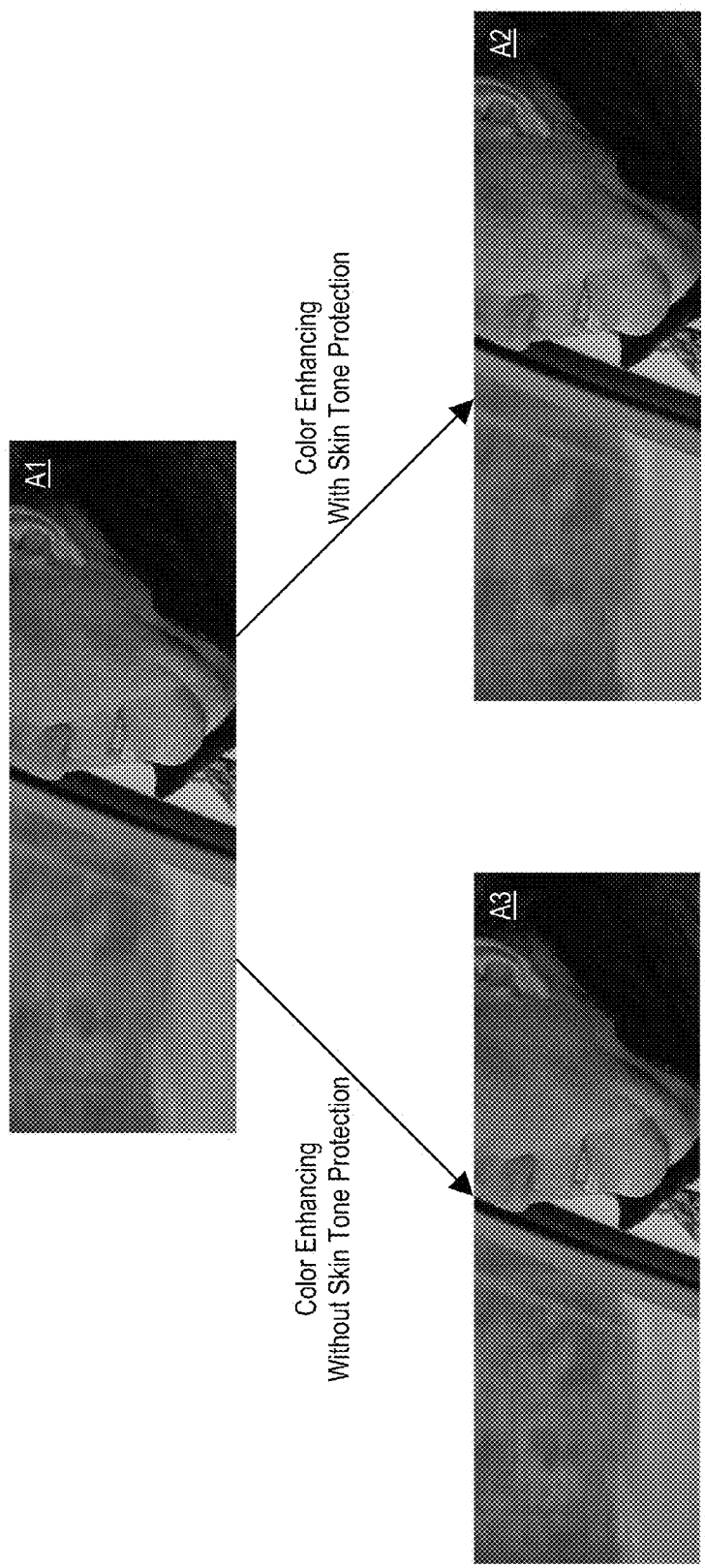
FIG. 11 illustrates different example color enhanced images resulting from applying color enhancing, in one or more embodiments.

FIG. 11 illustrates different example color enhanced images resulting from applying color enhancing, in one or more embodiments. The system 200 applies color enhancing with skin tone protection (e.g., via the in-device skin tone protection system 500) to an input image A1, resulting in a color enhanced image A2 presented on a consumer display (e.g., display device 60, such as a HDR TV). The color enhanced image A2 shows that colors that are not skin tones are enhanced (e.g., forest background is enhanced), and colors that are skin tones are minimally or not enhanced (e.g., face is protected from oversaturation). By comparison, applying color enhancing without skin tone protection to the input image A1 results in a color enhanced image A3 presented on the consumer display instead, where colors that are skin tones are oversaturated (e.g., face appears unnaturally yellowish).

Figure 12:
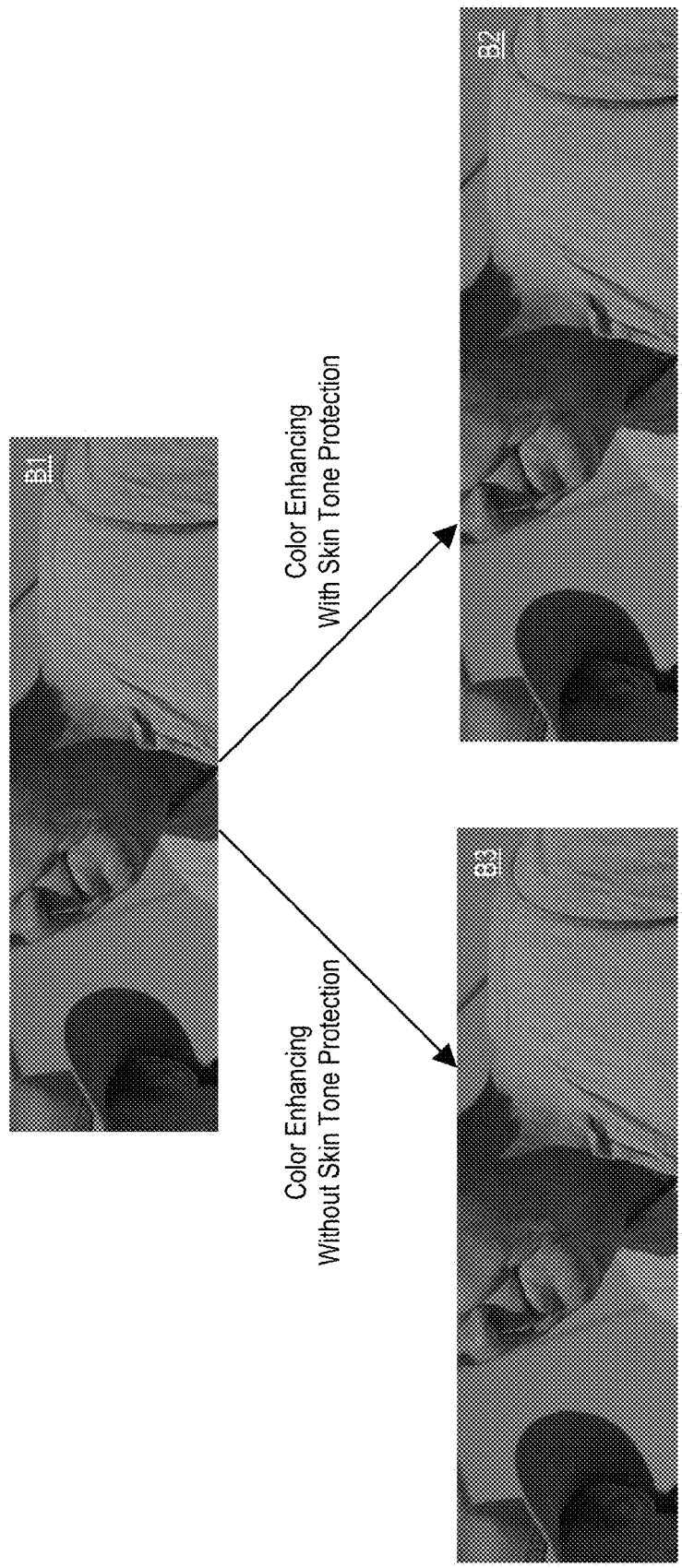
FIG. 12 illustrates different example color enhanced images resulting from applying color enhancing, in one or more embodiments.

FIG. 12 illustrates different example color enhanced images resulting from applying color enhancing, in one or more embodiments. The system 200 applies color enhancing with skin tone protection (e.g., via the in-device skin tone protection system 500) to an input image B1, resulting in a color enhanced image B2 presented on a consumer display (e.g., display device 60, such as a HDR TV). The color enhanced image B2 shows that colors that are not skin tones are enhanced (e.g., sky background is enhanced), and colors that are skin tones are minimally or not enhanced (e.g., face is protected from oversaturation). By comparison, applying color enhancing without skin tone protection to the input image B1 results in a color enhanced image B3 presented on the consumer display instead, where colors that are skin tones are oversaturated (e.g., face appears burnt).

Figure 13:
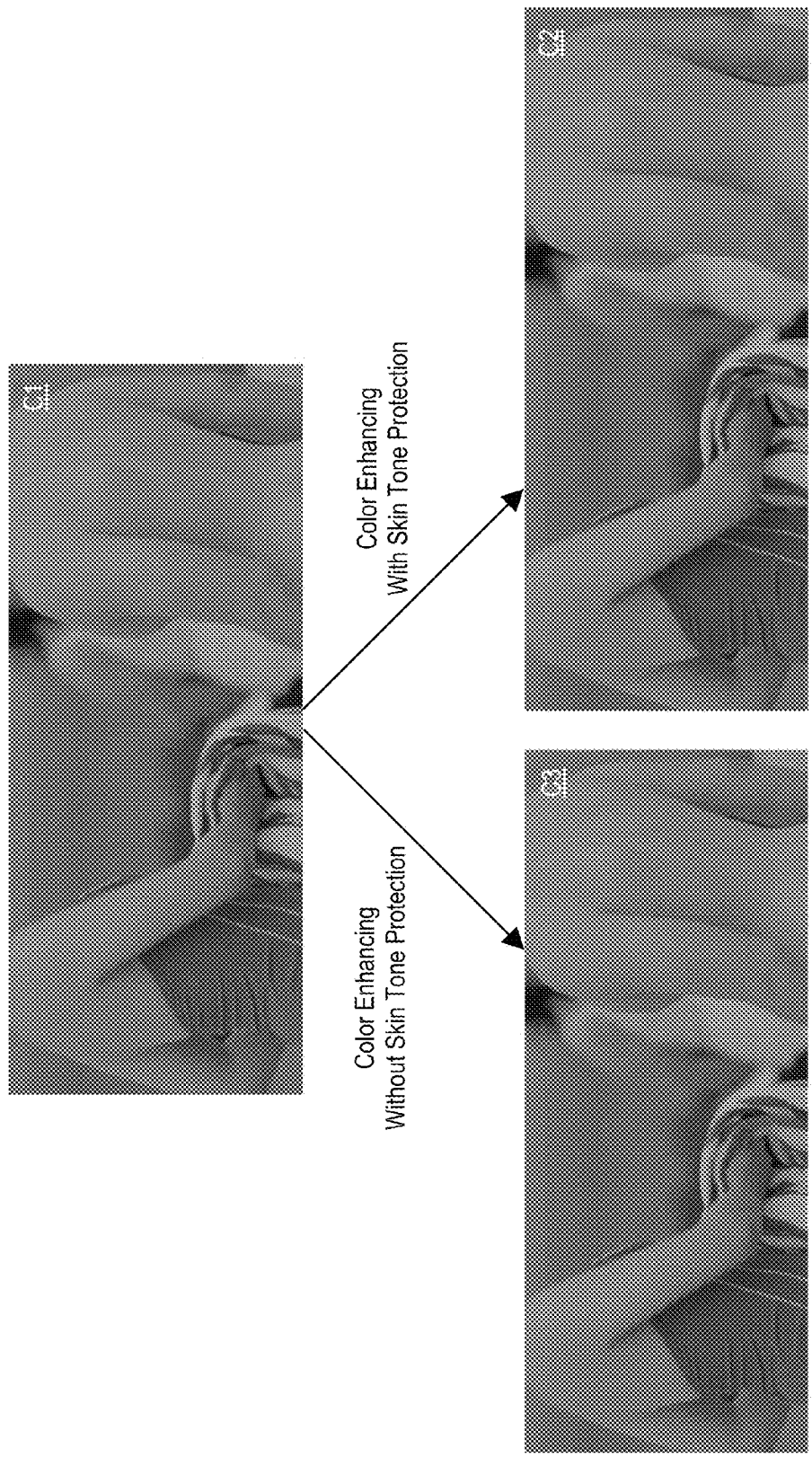
FIG. 13 illustrates different example color enhanced images resulting from applying color enhancing, in one or more embodiments.

FIG. 13 illustrates different example color enhanced images resulting from applying color enhancing, in one or more embodiments. The system 200 applies color enhancing with skin tone protection (e.g., via the in-device skin tone protection system 500) to an input image C1, resulting in a color enhanced image C2 presented on a consumer display (e.g., display device 60, such as a HDR TV). The color enhanced image C2 shows that colors that are not skin tones are enhanced (e.g., clothing is enhanced), and colors that are skin tones are minimally or not enhanced (e.g., skin is protected from oversaturation). By comparison, applying color enhancing without skin tone protection to the input image C1 results in a color enhanced image C3 presented on the consumer display instead, where colors that are skin tones are oversaturated (e.g., skin appears burnt).

Figure 14:
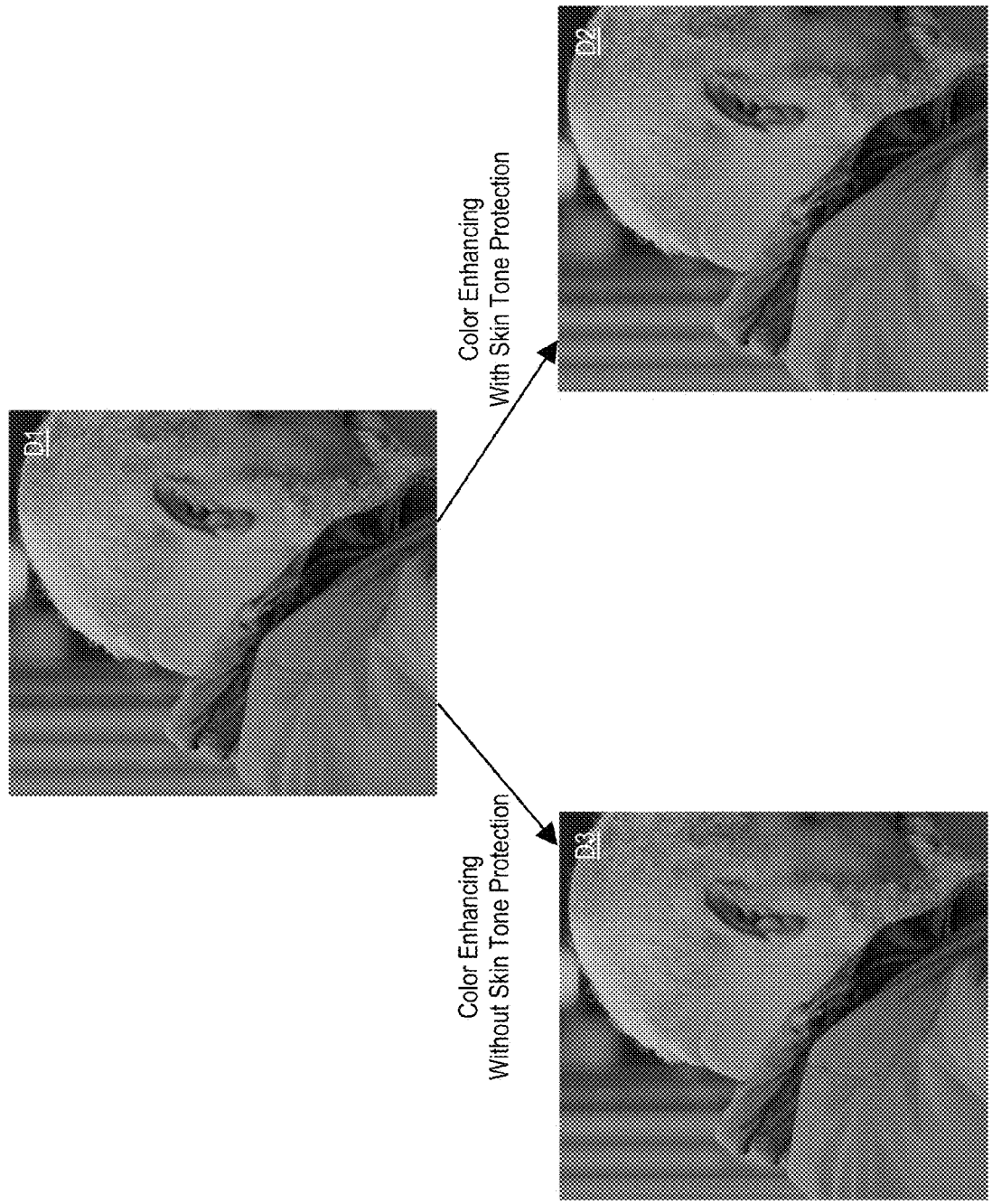
FIG. 14 illustrates different example color enhanced images resulting from applying color enhancing, in one or more embodiments.

FIG. 14 illustrates different example color enhanced images resulting from applying color enhancing, in one or more embodiments. The system 200 applies color enhancing with skin tone protection (e.g., via the in-device skin tone protection system 500) to an input image D1, resulting in a color enhanced image D2 presented on a consumer display (e.g., display device 60, such as a HDR TV). The color enhanced image D2 shows that colors that are not skin tones are enhanced (e.g., clothing is enhanced), and colors that are skin tones are minimally or not enhanced (e.g., skin is protected from oversaturation). By comparison, applying color enhancing without skin tone protection to the input image D1 results in a color enhanced image D3 presented on the consumer display instead, where colors that are skin tones are oversaturated (e.g., skin appears reddish and burnt).

Figure 15:
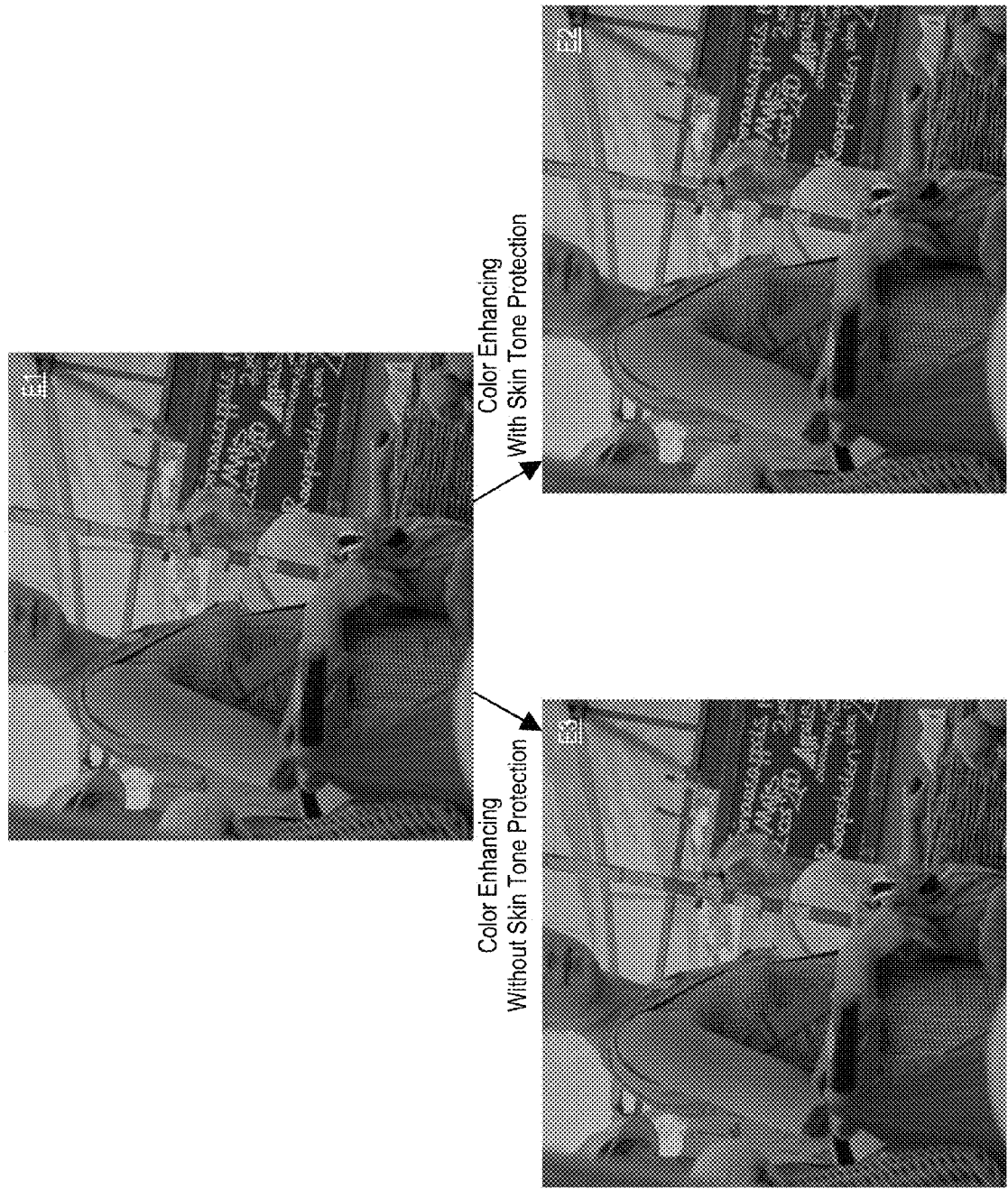
FIG. 15 illustrates different example color enhanced images resulting from applying color enhancing, in one or more embodiments.

FIG. 15 illustrates different example color enhanced images resulting from applying color enhancing, in one or more embodiments. The system 200 applies color enhancing with skin tone protection (e.g., via the in-device skin tone protection system 500) to an input image E1, resulting in a color enhanced image E2 presented on a consumer display (e.g., display device 60, such as a HDR TV). The color enhanced image E2 shows that colors that are not skin tones are enhanced (e.g., red bag is enhanced), and colors that are skin tones are minimally or not enhanced (e.g., skin is protected from oversaturation). By comparison, applying color enhancing without skin tone protection to the input image E1 results in a color enhanced image E3 presented on the consumer display instead, where colors that are skin tones are oversaturated (e.g., skin appears unnaturally yellowish).

Figure 16:
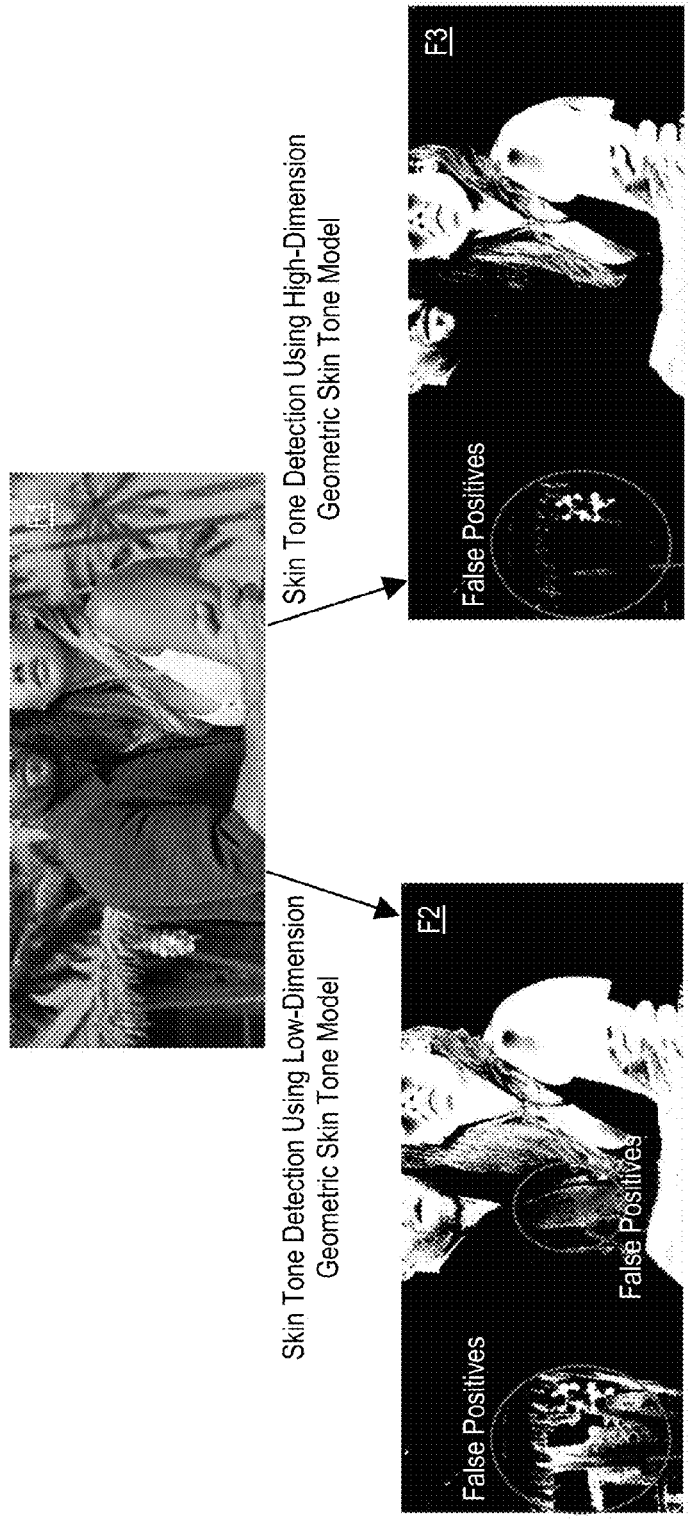
FIG. 16 illustrates differences between using a low-dimension geometric skin tone model and a high-dimension geometric skin tone model for skin tone protection, in one or more embodiments.

FIG. 16 illustrates differences between using a low-dimension geometric skin tone model and a high-dimension geometric skin tone model for skin tone protection, in one or more embodiments. Utilizing a low-dimension geometric skin tone model to detect skin tones captured in an input image F1 results in a skin tone map F2, wherein detected skin tones in the map F2 have very low saturation (appears nearly white). Utilizing a high-dimension geometric skin tone model to detect skin tones captured in the same input image F1 results in a skin tone map F3, wherein detected skin tones in the map F3 have very low saturation (appears nearly white). Both the low-dimension geometric skin tone model and the high-dimension geometric skin tone model correctly detect skin tones in the faces and the upper body parts captured in the input image F1.

The low-dimension geometric skin tone model, however, yields more false positives (e.g., some parts of the background and clothing captured in the input image F1 are incorrectly detected as skin tones) as marginal distribution of pdf makes the low-dimension geometric skin tone model detect more colors as it accumulates all occurrences of skin tones in different brightness levels to the x-y plane. By comparison, the high-dimension geometric skin tone model significantly decreases false positives, but is more expensive in hardware implementation.

Figure 17:
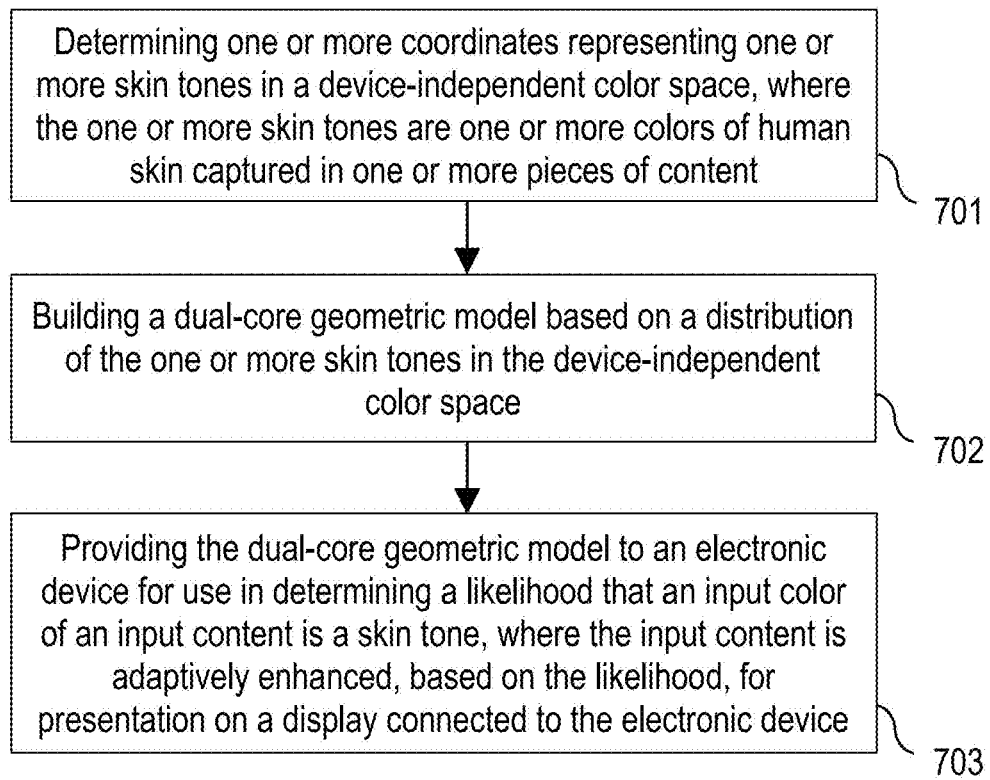
FIG. 17 is a flowchart of an example process for skin tone protection using a dual-core geometric skin tone model built in device-independent space, in one or more embodiments.

FIG. 17 is a flowchart of an example process 700 for skin tone protection using a dual-core geometric skin tone model built in device-independent space, in one or more embodiments. Process block 701 includes determining one or more coordinates representing one or more skin tones in a device-independent color space, where the one or more skin tones can include one or more colors of human skin captured in one or more pieces of content. Process block 702 includes building a dual-core geometric model based on a distribution of the one or more skin tones in the device-independent color space. Process block 703 includes providing the dual-core geometric model to an electronic device for use in determining a likelihood that an input color of an input content is a skin tone, wherein the input content is adaptively enhanced, based on the likelihood, for presentation on a display connected to the electronic device.

In one embodiment, process blocks 701-703 may be performed by one or more components of the off-device skin tone model generation system 330.

Figure 18:
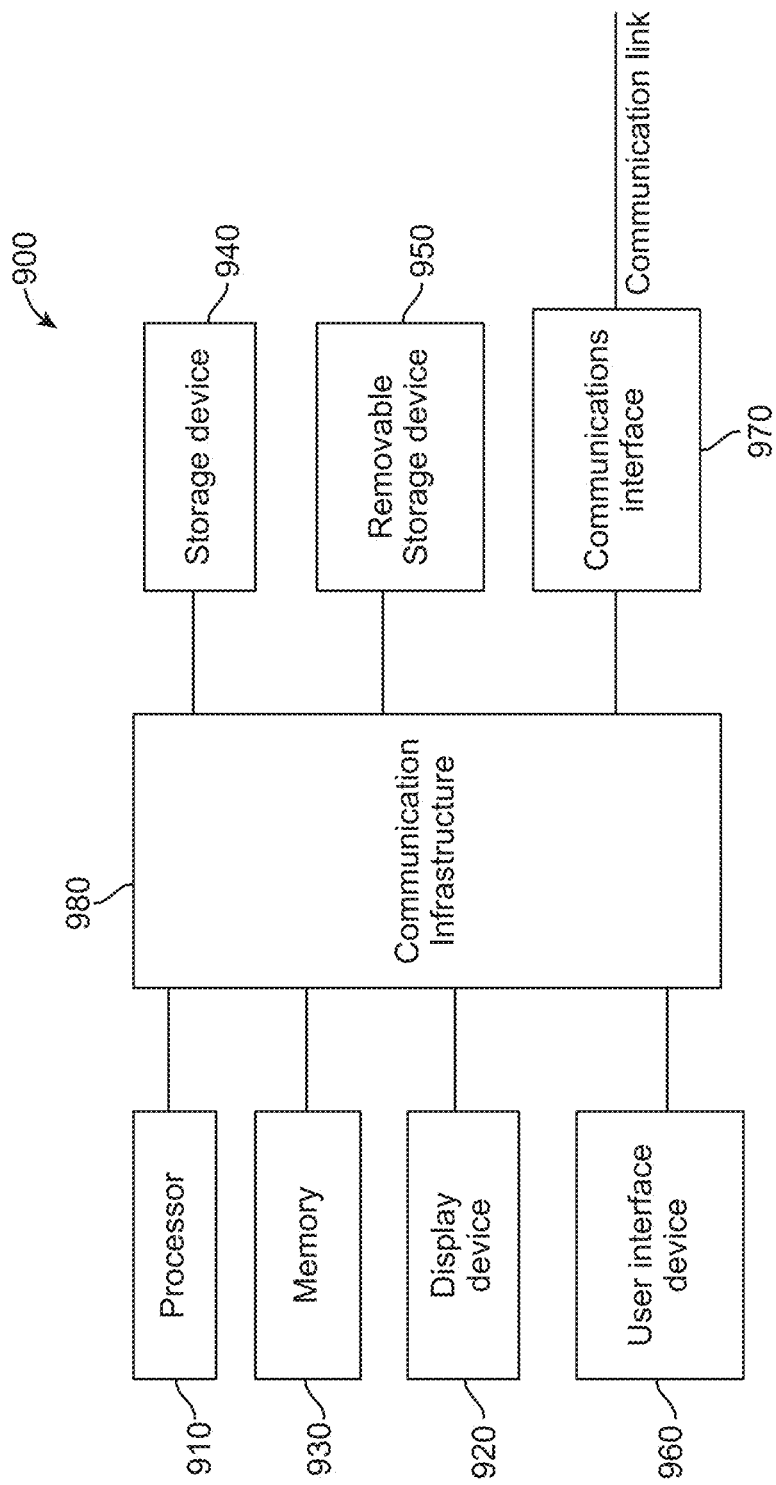
FIG. 18 is a high-level block diagram showing an information processing system comprising a computer system useful for implementing the disclosed embodiments.

FIG. 18 is a high-level block diagram showing an information processing system comprising a computer system 900 useful for implementing the disclosed embodiments. The systems 200, 330, 400, and/or 500 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 600 (FIG. 9), process 610 (FIG. 10), and/or process 800 (FIG. 17) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    determining one or more coordinates representing one or more skin tones in a device-independent color space, wherein the one or more skin tones include one or more colors of human skin captured in one or more pieces of content;
    building a dual-core geometric model based on a distribution of the one or more skin tones in the device-independent color space, the dual-core geometric model having one or more linearized boundaries; and
    providing the dual-core geometric model to an electronic device for use in determining a likelihood that an input color of an input content is a skin tone, wherein the input content is adaptively enhanced, based on the likelihood, for presentation on a display connected to the electronic device.

2. The method of claim 1, wherein the device-independent color space comprises a perceptually non-uniform International Commission on Illumination (CIE) 1931 xyY color space.

3. The method of claim 1, wherein building the dual-core geometric model based on the distribution of the one or more skin tones in the device-independent color space comprises:
    computing a probability density function (pdf) representing a high-dimension distribution of the one or more skin tones.

4. The method of claim 3, wherein building the dual-core geometric model based on the distribution of the one or more skin tones in the device-independent color space further comprises:
    building the dual-core geometric model based on the pdf, wherein the dual-core geometric model is a high-dimension dual-core geometric model.

5. The method of claim 3, wherein building the dual-core geometric model based on the distribution of the one or more skin tones in the device-independent color space further comprises:
    computing a marginal distribution of the pdf, wherein the marginal distribution represents a low-dimension distribution of the one or more skin tones; and
    building the dual-core geometric model based on the marginal distribution, wherein the dual-core geometric model is a low-dimension dual-core geometric model.

6. The method of claim 1, wherein the dual-core geometric model comprises an inner core and an outer core.

7. The method of claim 6, wherein building the dual-core geometric model based on the distribution of the one or more skin tones in the device-independent color space comprises:
    linearizing boundaries of the inner core and the outer core.

8. The method of claim 7, wherein a first likelihood that a first color inside the inner core is a skin tone is higher than a second likelihood that a second color in between the inner core and the outer core is a skin tone, and a third likelihood that a third color outside the outer core is a skin tone is lower than the first likelihood and the second likelihood.

9. The method of claim 8, wherein the second likelihood gradually varies based on a relative position of the second color to the linearized boundaries of the inner core and the outer core.

10. The method of claim 9, wherein, if the input color is in between the inner core and the outer core, a portion of the input content that includes the input color is enhanced gradually based on a relative position of the input color to the linearized boundaries of the inner core and the outer core, resulting in an enhanced portion comprising at least one of a visually natural and smoothly enhanced input color or a visually natural and smoothly enhanced detail.

11. The method of claim 8, wherein a portion of the input content that includes the input color is enhanced if the input color is outside the outer core, resulting in an enhanced portion comprising at least one of an enhanced input color or an enhanced detail.

12. The method of claim 8, wherein a portion of the input content that includes the input color is not enhanced if the input color is inside the inner core.

13. A system comprising:
    at least one processor; and
    a non-transitory processor-readable memory device storing instructions that when executed by the at least one processor causes the at least one processor to perform operations including:
        determining one or more coordinates representing one or more skin tones in a device-independent color space, wherein the one or more skin tones include one or more colors of human skin captured in one or more pieces of content;
        building a dual-core geometric model based on a distribution of the one or more skin tones in the device-independent color space, the dual-core geometric model having one or more linearized boundaries; and
        providing the dual-core geometric model to an electronic device for use in determining a likelihood that an input color of an input content is a skin tone, wherein the input content is adaptively enhanced, based on the likelihood, for presentation on a display connected to the electronic device.

14. The system of claim 13, wherein the device-independent color space comprises a perceptually non-uniform CIE 1931 xyY color space.

15. The system of claim 13, wherein building the dual-core geometric model based on the distribution of the one or more skin tones in the device-independent color space comprises:
    computing a probability density function (pdf) representing a high-dimension distribution of the one or more skin tones.

16. The system of claim 15, wherein building the dual-core geometric model based on the distribution of the one or more skin tones in the device-independent color space further comprises:
    building the dual-core geometric model based on the pdf, wherein the dual-core geometric model is a high-dimension dual-core geometric model.

17. The system of claim 15, wherein building the dual-core geometric model based on the distribution of the one or more skin tones in the device-independent color space further comprises:
    computing a marginal distribution of the pdf, wherein the marginal distribution represents a low-dimension distribution of the one or more skin tones; and
    building the dual-core geometric model based on the marginal distribution, wherein the dual-core geometric model is a low-dimension dual-core geometric model.

18. The system of claim 13, wherein:
    the dual-core geometric model comprises an inner core and an outer core;
    a first likelihood that a first color inside the inner core is a skin tone is higher than a second likelihood that a second color in between the inner core and the outer core is a skin tone;
    a third likelihood that a third color outside the outer core is a skin tone is lower than the first likelihood and the second likelihood; and
    the second likelihood gradually varies based on a relative position of the second color to linearized boundaries of the inner core and the outer core.

19. The system of claim 18, wherein:
    a portion of the input content that includes the input color is enhanced if the input color is outside the outer core, resulting in an enhanced portion comprising at least one of an enhanced input color or an enhanced detail;
    the portion of the input color that includes the input color is not enhanced if the input color is inside the inner core; and
    if the input color is in between the inner core and the outer core, the portion of the input color that includes the input color is enhanced gradually based on a relative position of the input color to the linearized boundaries of the inner core and the outer core, resulting in the enhanced portion comprising at least one of a visually natural and smoothly enhanced input color or a visually natural and smoothly enhanced detail.

20. A non-transitory processor-readable medium that includes a program that when executed by a processor performs a method comprising:
    determining one or more coordinates representing one or more skin tones in a device-independent color space, wherein the one or more skin tones include one or more colors of human skin captured in one or more pieces of content;
    building a dual-core geometric model based on a distribution of the one or more skin tones in the device-independent color space, the dual-core geometric model having one or more linearized boundaries; and
    providing the dual-core geometric model to an electronic device for use in determining a likelihood that an input color of an input content is a skin tone, wherein the input content is adaptively enhanced, based on the likelihood, for presentation on a display connected to the electronic device.

* * * * *